(12) United States Patent
Qin et al.

(10) Patent No.: US 12,088,444 B2
(45) Date of Patent: Sep. 10, 2024

(54) COMMUNICATION METHOD AND COMMUNICATION APPARATUS

(71) Applicant: HUAWEI TECHNOLOGIES CO., LTD., Guangdong (CN)

(72) Inventors: Yi Qin, Shanghai (CN); Fan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 338 days.

(21) Appl. No.: 17/556,608

(22) Filed: Dec. 20, 2021

(65) Prior Publication Data
US 2022/0116253 A1 Apr. 14, 2022

Related U.S. Application Data

(63) Continuation of application No. PCT/CN2020/096471, filed on Jun. 17, 2020.

(30) Foreign Application Priority Data

Jun. 26, 2019 (CN) .......................... 201910557924.4

(51) Int. Cl.
H04L 27/26 (2006.01)
H04L 5/00 (2006.01)
H04L 27/34 (2006.01)

(52) U.S. Cl.
CPC ........ H04L 27/2602 (2013.01); H04L 5/0044 (2013.01); H04L 27/3416 (2013.01)

(58) Field of Classification Search
CPC ............... H04L 27/2602; H04L 5/0044; H04L 27/3416; H04L 5/0023; H04L 5/003; H04L 5/0053; H04W 28/0263; H04B 10/66
See application file for complete search history.

(56) References Cited

U.S. PATENT DOCUMENTS

2005/0111590 A1 5/2005 Fang et al.
2015/0049692 A1 2/2015 Ding et al.
(Continued)

FOREIGN PATENT DOCUMENTS

CN 102387105 A 3/2012
CN 102694587 A 9/2012
(Continued)

OTHER PUBLICATIONS

Editor (Motorola), "Update of 36.213," 3GPP TSG-RAN WG1 Meeting #51, R1-075116, Jeju, Korea, Nov. 5-9, 2007, 16 pages.
(Continued)

Primary Examiner — Chae S Lee
(74) Attorney, Agent, or Firm — Fish & Richardson P.C.

(57) ABSTRACT

The present disclosure provides example communication methods and example communication apparatuses for non-coherent transmission. One example communication method includes determining $P_1$ first symbols based on a first to-be-modulated bit, where $P_1 = M \times N_1$, $N_1$ is a quantity of resource units used to carry the $P_1$ first symbols, M is a positive integer, and $N_1$ is an integer greater than 1. $P_2$ second symbols are determined based on a second to-be-modulated bit, where $P_2 = M \times N_2$, and $N_2$ is an integer greater than 1. $P_3$ third symbols are determined based on the $P_1$ first symbols and the $P_2$ second symbols, where $P_3 = M \times N_3$, $N_3$ is a quantity of resource units used to carry the $P_3$ third symbols, and $N_3$ is less than or equal to $N_2$. The $P_1$ first symbols and the $P_3$ third symbols are sent.

20 Claims, 5 Drawing Sheets

(56) References Cited

U.S. PATENT DOCUMENTS

2016/0036619 A1 2/2016 Yan et al.
2021/0399773 A1* 12/2021 Huang ................ H04B 17/364

FOREIGN PATENT DOCUMENTS

| CN | 104243392 A | 12/2014 | | |
|---|---|---|---|---|
| CN | 106105075 A | 11/2016 | | |
| CN | 106160936 A | 11/2016 | | |
| CN | 106170940 A | 11/2016 | | |
| CN | 108282435 A | 7/2018 | | |
| CN | 109417451 A | 3/2019 | | |
| WO | WO-2017177825 A1 * | 10/2017 | ............... | H04L 5/00 |

OTHER PUBLICATIONS

Office Action issued in Chinese Application No. 201910557924.4 on Sep. 17, 2021, 17 pages (with English translation).
PCT International Search Report and Written Opinion issued in International Application No. PCT/CN2020/096471 on Sep. 22, 2020, 15 pages (with English translation).
ZTE, RITT, CATT, TD-Tech, Spreadtrum Communications, "Mapping of bits onto signal point constellation for LCR TDD 64QAM modulation," 3GPP TSG RAN WG1 #51bis, R1-080560, Sevilla, Spain, Jan. 14-18, 2008, 7 pages.
ZTE, Sanechips, "Transmitter side designs for Noma," 3GPP TSG RAN WG1 Meeting #95 , R1-1812172, Spokane, USA, Nov. 12-16, 2018, 7 pages.

* cited by examiner

COMMUNICATION METHOD AND COMMUNICATION APPARATUS

CROSS-REFERENCE TO RELATED APPLICATIONS

This application is a continuation of International Application No. PCT/CN2020/096471, filed on Jun. 17, 2020, which claims priority to Chinese Patent Application No. 201910557924.4, filed on Jun. 26, 2019. The disclosures of the aforementioned applications are hereby incorporated by reference in their entireties.

TECHNICAL FIELD

This application relates to the communication field, and more specifically, to a communication method and a communication apparatus in the communication field.

BACKGROUND

Currently, a data transmission method based on non-coherent transmission has been known. In this method, any constellation point in a constellation corresponds to P symbols, where P=M*N, M is a quantity of antennas used for sending data, N is a quantity of resource units used for sending the data, and N is an integer greater than 1. For to-be-modulated data, a transmit end device maps the to-be-modulated data to P symbols corresponding to one constellation point to generate P symbols, and sends the P symbols by using M antennas and N resource units. In this method, a space generated by using row vectors of a matrix corresponding to the M*N symbols carries the to-be-modulated data, so that a receive end device can obtain the space generated by using the row vectors of the matrix without knowing channel state information, and can obtain the to-be-modulated data through demodulation based on the matrix.

In this method, spaces generated by using row vectors of matrices corresponding to any two constellation points in the constellation are different. Specifically, matrices corresponding to two constellation points in a constellation are respectively denoted as $X_1$ and $X_2$, where $X_1$ and $X_2$ are each an M*N matrix, and a space generated by using row vectors of $X_1$ is different from a space generated by using row vectors of $X_2$. Therefore, it means that an M*M square matrix T enabling $X_1 = T*X_2$ does not exist, because left-multiplying $X_2$ by the matrix T may be understood as linear transformation of $X_2$. $X_2$ may become $X_1$ through linear transformation when T exists, and the spaces generated by using the row vectors of $X_1$ and $X_2$ are the same. Therefore, in non-coherent transmission, a matrix T used to perform linear transformation on a matrix corresponding to a constellation point does not exist.

Based on a design of the constellation for non-coherent transmission, after linear transformation is performed on a matrix corresponding to a constellation point by using an arbitrary matrix T, information carried by the constellation point does not change. Therefore, the matrix T cannot carry the information. In this case, for each antenna, M degrees of freedom is lost. In other words, M resource units are lost, or information carried on the M resource units is lost.

Therefore, a technology needs to be provided to reduce wasted degrees of freedom in non-coherent transmission, to improve resource utilization.

SUMMARY

This application provides a communication method and a communication apparatus. To-be-modulated bits are modulated by using constellation points corresponding to a plurality of resource units, to obtain a group of symbols corresponding to each to-be-modulated bit. A plurality of groups (for example, two or three groups) of symbols are associated, to determine symbols that are actually sent, so that wasted degrees of freedom in non-coherent transmission can be reduced, to improve resource utilization.

According to a first aspect, a communication method is provided. The method includes:

determining $P_1$ first symbols based on a first to-be-modulated bit, where $P_1 = M \times N_1$, $N_1$ is a quantity of resource units used to carry the $P_1$ first symbols, M is a positive integer, and $N_1$ is an integer greater than 1;

determining a second constellation point based on a second to-be-modulated bit, where the second constellation point corresponds to $P_2$ second symbols, $P_2 = M \times N_2$, and $N_2$ is an integer greater than 1;

determining $P_3$ third symbols based on the $P_1$ first symbols and the $P_2$ second symbols, where $P_3 = M \times N_3$, $N_3$ is a quantity of resource units used to carry the $P_3$ third symbols, and $N_3$ is less than or equal to $N_2$; and sending the $P_1$ first symbols and the $P_3$ third symbols.

$N_2$ may be understood as a quantity of resource units used to carry the $P_2$ second symbols.

Therefore, according to the communication method provided in this embodiment of this application, the first to-be-modulated bit and the second to-be-modulated bit are modulated by using constellation points corresponding to a plurality of resource units, to obtain the $P_1$ first symbols carrying the first to-be-modulated bit and the $P_2$ second symbols carrying the second to-be-modulated bit. The $P_1$ first symbols are associated with the $P_2$ second symbols, to determine the $P_3$ third symbols that are actually sent and related to the second to-be-modulated bit. The $P_1$ first symbols and the $P_3$ third symbols are sent, so that wasted degrees of freedom in non-coherent transmission can be reduced, to improve resource utilization.

Herein, the $P_3$ third symbols related to the second to-be-modulated bit may be all or a portion of symbols that carry the second to-be-modulated bit, or may be symbols that carry other bits including the second to-be-modulated bit.

Optionally, the method further includes: skipping sending demodulation reference signals of the $P_1$ first symbols and demodulation reference signals of the $P_3$ third symbols.

Optionally, $N_2 = N_3$ and $P_2 = P_3$; and the $P_1$ first symbols are carried on the $N_1$ resource units, the $P_3$ third symbols are carried on the $N_3$ resource units, the $P_1$ first symbols and the $P_3$ third symbols include $P_4$ overlapping symbols, the $N_1$ resource units and the $N_3$ resource units include $N_4$ overlapping resource units, the $P_4$ symbols are carried on the $N_4$ resource units, and the $P_3$ third symbols have a linear relationship with the $P_2$ second symbols, where $P_4 = M \times N_4$, and $N_4$ is an integer greater than or equal to 1 and less than or equal to M.

Therefore, according to the communication method provided in this embodiment of this application, the $P_1$ first symbols are associated with the $P_2$ second symbols, to determine the $P_3$ third symbols that are actually sent and that carry the second to-be-modulated bit, so that the $P_1$ first symbols and the $P_3$ third symbols include the $P_4$ overlapping symbols, and the $N_4$ overlapping resource units in the $N_1$ resource units carrying the $P_1$ first symbols and the $N_3$ resource units carrying the $P_3$ third symbols carry the $P_4$ symbols. This means that the $N_4$ resource units carry the symbols that are in both the $P_1$ first symbols and the $P_3$ third symbols. In this case, in a resource mapping process, only the $P_4$ symbols need to be mapped to the $N_4$ resource units, symbols that are other than the $P_4$ symbols in the $P_1$ first symbols are mapped to $N_1-N_4$ resource units, and symbols that are other than the $P_4$ symbols in the $P_3$ third symbols are mapped to $N_2-N_4$ resource units. Therefore, for transmission of the $P_1$ first symbols and the $P_3$ third symbols, $N_1+N_2$ resource units are used in a conventional technology, and $N_1+N_2-N_4$ resource units are used in this embodiment of this application. That is, the $N_4$ resource units are reused. Compared with the conventional technology, resources that should originally carry symbols whose quantity is equal to a quantity of the overlapping symbols are saved, thereby improving resource utilization.

Optionally, $N_3=N_2-N_4$ and $P_3=P_2-P_4$; and the $P_1$ first symbols are carried on the $N_1$ resource units, the $N_1$ resource units include $N_4$ resource units used to carry $P_4$ symbols, the $P_3$ third symbols are carried on the $N_3$ resource units, and $P_2$ third symbols including the $P_4$ symbols and the $P_3$ third symbols have a linear relationship with the $P_2$ second symbols, where $P_4=M \times N_4$, and $N_4$ is an integer greater than or equal to 1 and less than or equal to M.

Therefore, according to the communication method provided in this embodiment of this application, the $P_1$ first symbols are associated with the $P_2$ second symbols, and linear transformation is performed on the $P_2$ second symbols to obtain the $P_2$ third symbols that actually carry the second to-be-modulated bit, where the $P_2$ third symbols include the $P_3$ third symbols and the $P_4$ symbols, and the $P_4$ symbols are overlapping symbols of the $P_2$ third symbols and the $P_1$ first symbols. In this case, the $N_4$ overlapping resource units in resources carrying the $P_1$ first symbols and resources carrying the $P_2$ third symbols carry the $P_4$ symbols. This means that the $N_4$ resource units carry the symbols that are in both the $P_1$ first symbols and the $P_2$ third symbols. In this case, in a resource mapping process, only the $P_4$ symbols need to be mapped to the $N_4$ resource units, symbols that are other than the $P_4$ symbols in the $P_1$ first symbols are mapped to $N_1-N_4$ resource units, and the $P_3$ third symbols are mapped to the $N_3$ resource units. Therefore, for transmission of the $P_1$ first symbols and the $P_3$ third symbols, $N_1+N_3+N_4$ resource units are used in a conventional technology, and $N_1+N_3$ resource units are used in this embodiment of this application. That is, the $N_4$ resource units are reused. Compared with the conventional technology, resources that should originally carry symbols whose quantity is equal to a quantity of the overlapping symbols are saved, thereby improving resource utilization.

Optionally, the determining $P_3$ third symbols based on the $P_1$ first symbols and the $P_2$ second symbols includes:

performing linear transformation on the $P_2$ second symbols based on the $P_4$ symbols and $P_4$ second symbols in the $P_2$ second symbols, to determine the $P_3$ third symbols.

Optionally, $N_4=M$.

Optionally, $N_2=N_3$;

the determining $P_1$ first symbols based on a first to-be-modulated bit includes:

determining a first constellation point based on the first to-be-modulated bit, where the first constellation point corresponds to $P_1$ fifth symbols; and performing, by using a matrix $T_1$, linear transformation on a matrix including the $P_1$ fifth symbols, to determine the $P_1$ first symbols; and the determining $P_3$ third symbols based on the $P_1$ first symbols and the $P_2$ second symbols includes:

performing, by using a matrix $T_2$, linear transformation on a matrix including the $P_2$ second symbols, to determine the $P_3$ third symbols, where the matrix $T_2$ and the matrix $T_1$ satisfy any one of the following: $C_1=T_1T_2^{-1}$, $C_1=T_1^{-1}T_2$, $C_1=T_2^{-1}T_1^{-1}$, or $C_1=T_2^{-1}T_1$, where the matrix $C_1$ is a matrix with M rows and M columns, and a symbol including the matrix $C_1$ is determined based on a third to-be-modulated bit.

Therefore, according to the communication method provided in this embodiment of this application, linear transformation is performed on matrices including symbols corresponding to constellation points of to-be-modulated bits, and data is carried in a differential manner between two matrices that are used to perform linear transformation on matrices each including symbols corresponding to a constellation point, so that the two matrices may be combined to carry three to-be-modulated bits. Therefore, resources that are originally used to transmit only two to-be-modulated bits can be used to transmit three to-be-modulated bits. In this way, in a same resource condition, more data may be carried, thereby improving resource utilization. Specifically, the first to-be-modulated bit and the second to-be-modulated bit that are to be sent are separately modulated to obtain the $P_1$ fifth symbols corresponding to the first constellation point and the $P_2$ second symbols corresponding to the second constellation point. The matrix $T_1$ is used to perform linear transformation on the matrix including the $P_1$ fifth symbols, to obtain the $P_1$ first symbols. The matrix $T_2$ is used to perform linear transformation on the matrix including the $P_2$ second symbols, to obtain the $P_3$ third symbols. In addition, $T_2$ is associated with $T_1$ in a differential manner by using the matrix $C_1$ including the symbols that are determined based on the third to-be-modulated bit, so that the $P_1$ first symbols and the $P_3$ third symbols may be combined to carry the three to-be-modulated bits. In this way, resources that are originally only used to transmit the first to-be-modulated bit and the second to-be-modulated bit can be used to transmit the three to-be-modulated bits, thereby saving resources.

Optionally, the $P_1$ first symbols are carried on the $N_1$ resource units, the $P_3$ third symbols are carried on the $N_3$ resource units, and the $N_1$ resource units are adjacent to the $N_3$ resource units in time domain or frequency domain.

Therefore, according to the communication method provided in this embodiment of this application, the $N_1$ resource units are adjacent to the $N_3$ resource units in time domain or frequency domain, so that a channel change between the $N_1$ resource units and the $N_3$ resource units is slight, and data transmission performance in non-coherent transmission can be improved.

Optionally, the first to-be-modulated bit and the second to-be-modulated bit are determined based on at least one bit of a first to-be-transmitted bit stream, and the third to-be-modulated bit is determined based on at least one bit of a second to-be-transmitted bit stream; the first to-be-modulated bit and the second to-be-modulated bit belong to a first to-be-transmitted bit stream, and the third to-be-modulated bit belongs to a second to-be-transmitted bit stream; the first to-be-modulated bit and the second to-be-modulated bit are determined based on at least one bit of a first to-be-transmitted bit stream, and the third to-be-modulated bit belongs to a second to-be-transmitted bit stream; or the first to-be-modulated bit and the second to-be-modulated bit belong to a first to-be-transmitted bit stream, and the third to-be-modulated bit is determined based on at least one bit of a second to-be-transmitted bit stream, where a code rate of the first to-be-transmitted bit stream is different from a code rate of the second to-be-transmitted bit stream;

a modulation scheme of the first to-be-transmitted bit stream is different from a modulation scheme of the second to-be-transmitted bit stream; and/or spectral efficiency of the first to-be-transmitted bit stream is different from spectral efficiency of the second to-be-transmitted bit stream.

The first to-be-transmitted bit stream is data transmitted through non-coherent transmission, and the second to-be-transmitted bit stream is data transmitted between different modulation resource blocks in a differential manner. For the second to-be-transmitted bit stream, channel values of the two modulation resource blocks inevitably have a difference, and a significant channel change results in poor data transmission performance. For the first to-be-transmitted bit stream, channel values of a same modulation resource block may be considered to be approximate. Therefore, a channel slightly changes, and data transmission performance is good. Therefore, according to the communication method provided in this embodiment of this application, different transmission parameters (for example, code rates, modulation schemes, and spectral efficiency) are configured for the first to-be-transmitted bit stream and the second to-be-transmitted bit stream, so that the transmission parameters can well match with transmission performance of the two transmission modes.

Optionally, the modulation scheme of the second to-be-transmitted bit stream is phase shift keying PSK.

Therefore, according to the communication method provided in this embodiment of this application, the second to-be-transmitted bit stream is modulated by using the PSK, so that a peak to average power ratio (PAPR) in a data transmission process is effectively reduced without changing an amplitude of a symbol.

According to a second aspect, a communication method is provided. The method includes:

receiving $P_1$ first symbols and $P_3$ third symbols, where $P_1=M\times N_1$, the $P_1$ first symbols are based on a first to-be-modulated bit, $P_3=M\times N_3$, the $P_3$ third symbols are determined based on the $P_1$ first symbols and $P_2$ second symbols, the $P_2$ second symbols are determined based on a second to-be-modulated bit, $P_2=M\times N_2$, M is a positive integer, $N_1$ is a quantity of resource units used to carry the $P_1$ first symbols, $N_1$ is an integer greater than 1, $N_2$ is an integer greater than 1, $N_3$ is a quantity of resource units used to carry the $P_3$ third symbols, and $N_3$ is less than or equal to $N_2$; and determining the first to-be-modulated bit and the second to-be-modulated bit based on the $P_1$ first symbols and the $P_3$ third symbols.

Therefore, according to the communication method provided in this embodiment of this application, the first to-be-modulated bit and the second to-be-modulated bit are modulated by using constellation points corresponding to a plurality of resource units, to obtain the $P_1$ first symbols carrying the first to-be-modulated bit and the $P_2$ second symbols carrying the second to-be-modulated bit. The $P_1$ first symbols are associated with the $P_2$ second symbols, to determine the $P_3$ third symbols that are actually sent and related to the second to-be-modulated bit. The $P_1$ first symbols and the $P_3$ third symbols are sent, so that wasted degrees of freedom in non-coherent transmission can be reduced, to improve resource utilization.

Optionally, the method further includes: skipping receiving demodulation reference signals of the $P_1$ first symbols and demodulation reference signals of the $P_3$ third symbols.

Optionally, $N_2=N_3$ and $P_2=P_3$; and the $P_1$ first symbols are carried on the $N_1$ resource units, the $P_3$ third symbols are carried on the $N_3$ resource units, the $N_1$ resource units and the $N_3$ resource units include $N_4$ overlapping resource units, the $P_1$ first symbols and the $P_3$ third symbols include $P_4$ overlapping symbols, the $P_4$ symbols are carried on the $N_4$ resource units, and the $P_3$ third symbols have a linear relationship with the $P_2$ second symbols, where $P_4=M\times N_4$, and $N_4$ is an integer greater than or equal to 1 and less than or equal to M.

Therefore, according to the communication method provided in this embodiment of this application, the $P_1$ first symbols are associated with the $P_2$ second symbols, to determine the $P_3$ third symbols that are actually sent and that carry the second to-be-modulated bit, so that the $P_1$ first symbols and the $P_3$ third symbols include the $P_4$ overlapping symbols, and the $N_4$ overlapping resource units in the $N_1$ resource units carrying the $P_1$ first symbols and the $N_3$ resource units carrying the $P_3$ third symbols carry the $P_4$ symbols. This means that the $N_4$ resource units carry the symbols that are in both the $P_1$ first symbols and the $P_3$ third symbols. In this case, in a resource mapping process, only the $P_4$ symbols need to be mapped to the $N_4$ resource units, symbols that are other than the $P_4$ symbols in the $P_1$ first symbols are mapped to $N_1-N_4$ resource units, and symbols that are other than the $P_4$ symbols in the $P_3$ third symbols are mapped to $N_2-N_4$ resource units. Therefore, for transmission of the $P_1$ first symbols and the $P_3$ third symbols, $N_1+N_2$ resource units are used in a conventional technology, and $N_1+N_2-N_4$ resource units are used in this embodiment of this application. That is, the $N_4$ resource units are reused. Compared with the conventional technology, resources that should originally carry symbols whose quantity is equal to a quantity of the overlapping symbols are saved, thereby improving resource utilization.

Optionally, $\overline{X}_2=A_1B_2X_2$, where the matrix $X_2$ is a matrix including the $P_2$ second symbols, the matrix $X_2$ is a matrix with M rows and $N_2$ columns, the matrix $\overline{X}_2$ is a matrix including the $P_3$ third symbols, the matrix $\overline{X}_2$ is a matrix with M rows and $N_2$ columns, the matrix $B_2$ is a matrix including $P_4$ second symbols in the $P_2$ second symbols, the matrix $B_2$ is a matrix with M rows and $N_4$ columns, the matrix $A_1$ is a matrix including the $P_4$ symbols, and the matrix $A_1$ is a matrix with M rows and $N_4$ columns.

Optionally, $N_3=N_2-N_4$ and $P_3=P_2-P_4$; and the $P_1$ first symbols are carried on the $N_1$ resource units, the $N_1$ resource units include $N_4$ resource units used to carry $P_4$ symbols, the $P_3$ third symbols are carried on the $N_3$ resource units, and $P_2$ third symbols including the $P_4$ symbols and the $P_3$ third symbols have a linear relationship with the $P_2$ second symbols, where $P_4=M\times N_4$, and $N_4$ is an integer greater than or equal to 1 and less than or equal to M.

Therefore, according to the communication method provided in this embodiment of this application, the $P_1$ first symbols are associated with the $P_2$ second symbols, and linear transformation is performed on the $P_2$ second symbols to obtain the $P_2$ third symbols that actually carry the second to-be-modulated bit, where the $P_2$ third symbols include the $P_3$ third symbols and the $P_4$ symbols, and the $P_4$ symbols are overlapping symbols of the $P_2$ third symbols and the $P_1$ first symbols. In this case, the $N_4$ overlapping resource units in resources carrying the $P_1$ first symbols and resources carrying the $P_2$ third symbols carry the $P_4$ symbols. This means that the $N_4$ resource units carry the symbols that are in both the $P_1$ first symbols and the $P_2$ third symbols. In this case, in a resource mapping process, only the $P_4$ symbols need to be mapped to the $N_4$ resource units, symbols that are other than the $P_4$ symbols in the $P_1$ first symbols are mapped to $N_1-N_4$ resource units, and the $P_3$ third symbols are mapped to the $N_3$ resource units. Therefore, for transmission of the $P_1$ first symbols and the $P_3$ third symbols, $N_1+N_3+N_4$ resource units are used in a conventional technology, and $N_1+N_3$ resource units are used in this embodiment of this application. That is, the $N_4$ resource units are reused. Compared with the conventional technology, resources that should originally carry symbols whose quantity is equal to a quantity of the overlapping symbols are saved, thereby improving resource utilization.

Optionally, $\overline{X}_2 = A_1 B_2 X_2$, where the matrix $X_2$ is a matrix including the $P_2$ second symbols, the matrix $X_2$ is a matrix with M rows and $N_2$ columns, the matrix $\overline{X}_2$ is a matrix including the $P_2$ third symbols, the matrix $\overline{X}_2$ is a matrix with M rows and $N_2$ columns, the matrix $A_1$ is a matrix including the $P_4$ symbols, the matrix $A_1$ is a matrix with M rows and $N_4$ columns, the matrix $B_2$ is a matrix including $P_4$ second symbols in the $P_2$ second symbols, the matrix $B_2$ is a matrix with M rows and $N_4$ columns, and symbols corresponding to a matrix $(\overline{X}_2 - A_1)$ are the $P_3$ third symbols.

Optionally, $N_4 = M$.

Optionally, $N_2 = N_3$;

$\overline{X}_1 = T_1 X_1$, where the matrix $X_1$ is a matrix including $P_1$ fifth symbols corresponding to a first constellation point, the first constellation point is determined based on the first to-be-modulated bit, the matrix $X_1$ is a matrix with M rows and $N_1$ columns, the matrix $T_1$ is a matrix with M rows and M columns, and the matrix $\overline{X}_1$ is a matrix including the $P_1$ first symbols;

$\overline{X}_2 = T_2 X_2$, where the matrix $X_2$ is a matrix including the $P_2$ second symbols, the matrix $X_2$ is a matrix with M rows and $N_2$ columns, the matrix $\overline{X}_2$ is a matrix including the $P_3$ third symbols, the matrix $T_2$ and the matrix $T_1$ satisfy any one of the following: $C_1 = T_1 T_2^{-1}$, $C_1 = T_1^{-1} T_2$, $C_1 = T_2 T_1^{-1}$, or $C_1 = T_2^{-1} T_1$, the matrix $T_2$ is a matrix with M rows and M columns, the matrix $C_1$ is a matrix with M rows and M columns, and a symbol including the matrix $C_1$ is determined based on a third to-be-modulated bit; and the determining the first to-be-modulated bit and the second to-be-modulated bit based on the $P_1$ first symbols and the $P_3$ third symbols includes:

determining the first to-be-modulated bit, the second to-be-modulated bit, and the third to-be-modulated bit based on the $P_1$ first symbols and the $P_3$ third symbols.

Therefore, according to the communication method provided in this embodiment of this application, linear transformation is performed on matrices including symbols corresponding to constellation points of to-be-modulated bits, and data is carried in a differential manner between two matrices that are used to perform linear transformation on matrices each including symbols corresponding to a constellation point, so that the two matrices may be combined to carry three to-be-modulated bits. Therefore, resources that are originally used to transmit only two to-be-modulated bits can be used to transmit three to-be-modulated bits. In this way, in a same resource condition, more data may be carried, thereby improving resource utilization. Specifically, the first to-be-modulated bit and the second to-be-modulated bit that are to be sent are separately modulated to obtain the $P_1$ fifth symbols corresponding to the first constellation point and the $P_2$ second symbols corresponding to the second constellation point. The matrix $T_1$ is used to perform linear transformation on the matrix including the $P_1$ fifth symbols, to obtain the $P_1$ first symbols. The matrix $T_2$ is used to perform linear transformation on the matrix including the $P_2$ second symbols, to obtain the $P_3$ third symbols. In addition, $T_2$ is associated with $T_1$ in a differential manner by using the matrix $C_1$ including the symbols that are determined based on the third to-be-modulated bit, so that the $P_1$ first symbols and the $P_3$ third symbols may be combined to carry the three to-be-modulated bits. In this way, resources that are originally only used to transmit the first to-be-modulated bit and the second to-be-modulated bit can be used to transmit the three to-be-modulated bits, thereby saving resources.

Optionally, the $P_1$ first symbols are carried on the $N_1$ resource units, the $P_3$ third symbols are carried on the $N_3$ resource units, and the $N_1$ resource units are adjacent to the $N_3$ resource units in time domain or frequency domain.

Therefore, according to the communication method provided in this embodiment of this application, the $N_1$ resource units are adjacent to the $N_3$ resource units in time domain or frequency domain, so that a channel change between the $N_1$ resource units and the $N_3$ resource units is slight, and data transmission performance in non-coherent transmission can be improved.

Optionally, the first to-be-modulated bit and the second to-be-modulated bit are determined based on at least one bit of a first to-be-transmitted bit stream, and the third to-be-modulated bit is determined based on at least one bit of a second to-be-transmitted bit stream; the first to-be-modulated bit and the second to-be-modulated bit belong to a first to-be-transmitted bit stream, and the third to-be-modulated bit belongs to a second to-be-transmitted bit stream; the first to-be-modulated bit and the second to-be-modulated bit are determined based on at least one bit of a first to-be-transmitted bit stream, and the third to-be-modulated bit belongs to a second to-be-transmitted bit stream; or the first to-be-modulated bit and the second to-be-modulated bit belong to a first to-be-transmitted bit stream, and the third to-be-modulated bit is determined based on at least one bit of a second to-be-transmitted bit stream, where a code rate of the first to-be-transmitted bit stream is different from a code rate of the second to-be-transmitted bit stream;

a modulation scheme of the first to-be-transmitted bit stream is different from a modulation scheme of the second to-be-transmitted bit stream; and/or spectral efficiency of the first to-be-transmitted bit stream is different from spectral efficiency of the second to-be-transmitted bit stream.

Therefore, according to the communication method provided in this embodiment of this application, different transmission parameters (for example, code rates, modulation schemes, and spectral efficiency) are configured for the first to-be-transmitted bit stream and the second to-be-transmitted bit stream, so that the transmission parameters can match with transmission performance of the two transmission modes.

Optionally, the modulation scheme of the second to-be-transmitted bit stream is phase shift keying PSK.

Therefore, according to the communication method provided in this embodiment of this application, the second to-be-transmitted bit stream is modulated by using the PSK, so that a peak to average power ratio (PAPR) in a data transmission process is effectively reduced without changing an amplitude of a symbol.

According to a third aspect, a communication apparatus is provided. The apparatus may be a transmit end device, may be an apparatus in the transmit end device, or may be another apparatus that can be used in cooperation with the transmit end device. The transmit end device may be a terminal device or a network device. The apparatus may include a processing unit and a transceiver unit. The processing unit and the transceiver unit may perform a corresponding function performed by the transmit end device in any design example of the first aspect. The following specifically describes functions of the units.

The processing unit is configured to:
determine $P_1$ first symbols based on a first to-be-modulated bit, where $P_1=M\times N_1$, $N_1$ is a quantity of resource units used to carry the $P_1$ first symbols, M is a positive integer, and $N_1$ is an integer greater than 1;
determine a second constellation point based on a second to-be-modulated bit, where the second constellation point corresponds to $P_2$ second symbols, $P_2=M\times N_2$, and $N_2$ is an integer greater than 1; and
determine $P_3$ third symbols based on the $P_1$ first symbols and the $P_2$ second symbols, where $P_3=M\times N_3$, $N_3$ is a quantity of resource units used to carry the $P_3$ third symbols, and $N_3$ is less than or equal to $N_2$.

The transceiver unit is configured to send the $P_1$ first symbols and the $P_3$ third symbols.

$N_2$ may be understood as a quantity of resource units used to carry the $P_2$ second symbols.

Optionally, the transceiver unit is not configured to send demodulation reference signals of the $P_1$ first symbols and demodulation reference signals of the $P_3$ third symbols.

Optionally, $N_2=N_3$ and $P_2=P_3$; and
the $P_1$ first symbols are carried on the $N_1$ resource units, the $P_3$ third symbols are carried on the $N_3$ resource units, the $P_1$ first symbols and the $P_3$ third symbols include $P_4$ overlapping symbols, the $N_1$ resource units and the $N_3$ resource units include $N_4$ overlapping resource units, the $P_4$ symbols are carried on the $N_4$ resource units, and the $P_3$ third symbols have a linear relationship with the $P_2$ second symbols, where $P_4=M\times N_4$, and $N_4$ is an integer greater than or equal to 1 and less than or equal to M.

Optionally, $N_3=N_2-N_4$ and $P_3=P_2-P_4$; and
the $P_1$ first symbols are carried on the $N_1$ resource units, the $N_1$ resource units include $N_4$ resource units used to carry $P_4$ symbols, the $P_3$ third symbols are carried on the $N_3$ resource units, and $P_2$ third symbols including the $P_4$ symbols and the $P_3$ third symbols have a linear relationship with the $P_2$ second symbols, where $P_4=M\times N_4$, and $N_4$ is an integer greater than or equal to 1 and less than or equal to M.

Optionally, the processing unit is specifically configured to:
perform linear transformation on the $P_2$ second symbols based on the $P_4$ symbols and $P_4$ second symbols in the $P_2$ second symbols, to determine the $P_3$ third symbols.

Optionally, $N_4=M$.
Optionally, $N_2=N_3$;
the processing unit is specifically configured to:
determine a first constellation point based on the first to-be-modulated bit, where the first constellation point corresponds to $P_1$ fifth symbols; and
perform, by using a matrix $T_1$, linear transformation on a matrix including the $P_1$ fifth symbols, to determine the $P_1$ first symbols; and the processing unit is further specifically configured to:
perform, by using a matrix $T_2$, linear transformation on a matrix including the $P_2$ second symbols, to determine the $P_3$ third symbols, where the matrix $T_2$ and the matrix $T_1$ satisfy any one of the following: $C_1=T_1 T_2^{-1}$, $C_1=T_1^{-1}T_2$, $C_1=T_2 T_1^{-1}$, or $C_1=T_2^{-1} T_1$, where the matrix $C_1$ is a matrix with M rows and M columns, and a symbol including the matrix $C_1$ is determined based on a third to-be-modulated bit.

Optionally, the $P_1$ first symbols are carried on the $N_1$ resource units, the $P_3$ third symbols are carried on the $N_3$ resource units, and the $N_1$ resource units are adjacent to the $N_3$ resource units in time domain or frequency domain.

Optionally, the first to-be-modulated bit and the second to-be-modulated bit are determined based on at least one bit of a first to-be-transmitted bit stream, and the third to-be-modulated bit is determined based on at least one bit of a second to-be-transmitted bit stream; the first to-be-modulated bit and the second to-be-modulated bit belong to a first to-be-transmitted bit stream, and the third to-be-modulated bit belongs to a second to-be-transmitted bit stream; the first to-be-modulated bit and the second to-be-modulated bit are determined based on at least one bit of a first to-be-transmitted bit stream, and the third to-be-modulated bit belongs to a second to-be-transmitted bit stream; or the first to-be-modulated bit and the second to-be-modulated bit belong to a first to-be-transmitted bit stream, and the third to-be-modulated bit is determined based on at least one bit of a second to-be-transmitted bit stream, where
a code rate of the first to-be-transmitted bit stream is different from a code rate of the second to-be-transmitted bit stream;
a modulation scheme of the first to-be-transmitted bit stream is different from a modulation scheme of the second to-be-transmitted bit stream; and/or
spectral efficiency of the first to-be-transmitted bit stream is different from spectral efficiency of the second to-be-transmitted bit stream.

Optionally, the modulation scheme of the second to-be-transmitted bit stream is phase shift keying PSK.

According to a fourth aspect, a communication apparatus is provided. The apparatus may be a receive end device, may be an apparatus in the receive end device, or may be another apparatus that can be used in cooperation with the receive end device. The receive end device may be a terminal device or a network device. The apparatus may include a processing unit and a transceiver unit. The processing unit and the transceiver unit may perform a corresponding function performed by the receive end device in any design example of the second aspect. The following specifically describes functions of the units.

The transceiver unit is configured to receive $P_1$ first symbols and $P_3$ third symbols, where $P_1=M\times N_1$, the $P_1$ first symbols are based on a first to-be-modulated bit, $P_3=M\times N_3$, the $P_3$ third symbols are determined based on the $P_1$ first symbols and $P_2$ second symbols, the $P_2$ second symbols are determined based on a second to-be-modulated bit, $P_2=M\times N_2$, M is a positive integer, $N_1$ is a quantity of resource units used to carry the $P_1$ first symbols, $N_1$ is an integer greater than 1, $N_2$ is an integer greater than 1, $N_3$ is a quantity of resource units used to carry the $P_3$ third symbols, and $N_3$ is less than or equal to $N_2$.

The processing unit is configured to determine the first to-be-modulated bit and the second to-be-modulated bit based on the $P_1$ first symbols and the $P_3$ third symbols.

Optionally, the transceiver unit is not configured to receive demodulation reference signals of the $P_1$ first symbols and demodulation reference signals of the $P_3$ third symbols.

Optionally, $N_2=N_3$ and $P_2=P_3$; and the $P_1$ first symbols are carried on the $N_1$ resource units, the $P_3$ third symbols are carried on the $N_3$ resource units, the $N_1$ resource units and the $N_3$ resource units include $N_4$ overlapping resource units, the $P_1$ first symbols and the $P_3$ third symbols include $P_4$ overlapping symbols, the $P_4$ symbols are carried on the $N_4$ resource units, and the $P_3$ third symbols have a linear relationship with the $P_2$ second symbols, where $P_4=M\times N_4$, and $N_4$ is an integer greater than or equal to 1 and less than or equal to M.

Optionally, $\overline{X}_2=A_1B_2X_2$, where the matrix $X_2$ is a matrix including the $P_2$ second symbols, the matrix $X_2$ is a matrix with M rows and $N_2$ columns, the matrix $\overline{X}_2$ is a matrix including the $P_3$ third symbols, the matrix $\overline{X}_2$ is a matrix with M rows and $N_2$ columns, the matrix $B_2$ is a matrix including $P_4$ second symbols in the $P_2$ second symbols, the matrix $B_2$ is a matrix with M rows and $N_4$ columns, the matrix $A_1$ is a matrix including the $P_4$ symbols, and the matrix $A_1$ is a matrix with M rows and $N_4$ columns.

Optionally, $N_3=N_2-N_4$ and $P_3=P_2-P_4$; and the $P_1$ first symbols are carried on the $N_1$ resource units, the $N_1$ resource units include $N_4$ resource units used to carry $P_4$ symbols, the $P_3$ third symbols are carried on the $N_3$ resource units, and $P_2$ third symbols including the $P_4$ symbols and the $P_3$ third symbols have a linear relationship with the $P_2$ second symbols, where $P_4=M\times N_4$, and $N_4$ is an integer greater than or equal to 1 and less than or equal to M.

Optionally, $\overline{X}_2=A_1B_2X_2$, where the matrix $X_2$ is a matrix including the $P_2$ second symbols, the matrix $X_2$ is a matrix with M rows and $N_2$ columns, the matrix $\overline{X}_2$ is a matrix including the $P_2$ third symbols, the matrix $\overline{X}_2$ is a matrix with M rows and $N_2$ columns, the matrix $A_1$ is a matrix including the $P_4$ symbols, the matrix $A_1$ is a matrix with M rows and $N_4$ columns, the matrix $B_2$ is a matrix including $P_4$ second symbols in the $P_2$ second symbols, the matrix $B_2$ is a matrix with M rows and $N_4$ columns, and symbols corresponding to a matrix $(\overline{X}_2-A_1)$ are the $P_3$ third symbols.

Optionally, $N_4=M$.

Optionally, $N_2=N_3$;

$\overline{X}_1=T_1X_1$, where the matrix $X_1$ is a matrix including $P_1$ fifth symbols corresponding to a first constellation point, the first constellation point is determined based on the first to-be-modulated bit, the matrix $X_1$ is a matrix with M rows and $N_1$ columns, the matrix $T_1$ is a matrix with M rows and M columns, and the matrix $\overline{X}_1$ is a matrix including the $P_1$ first symbols;

$\overline{X}_2=T_2X_2$, where the matrix $X_2$ is a matrix including the $P_2$ second symbols, the matrix $X_2$ is a matrix with M rows and $N_2$ columns, the matrix $\overline{X}_2$ is a matrix including the $P_3$ third symbols, the matrix $T_2$ and the matrix $T_1$ satisfy any one of the following: $C_1=T_1T_2^{-1}$, $C_1=T_1^{-1}T_2$, $C_1=T_2T_1^{-1}$, or $C_1=T_2^{-1}T_1$, the matrix $T_2$ is a matrix with M rows and M columns, the matrix $C_1$ is a matrix with M rows and M columns, and a symbol including the matrix $C_1$ is determined based on a third to-be-modulated bit; and the processing unit is specifically configured to:

determine the first to-be-modulated bit, the second to-be-modulated bit, and the third to-be-modulated bit based on the $P_1$ first symbols and the $P_3$ third symbols.

Optionally, the $P_1$ first symbols are carried on the $N_1$ resource units, the $P_3$ third symbols are carried on the $N_3$ resource units, and the $N_1$ resource units are adjacent to the $N_3$ resource units in time domain or frequency domain.

Optionally, the first to-be-modulated bit and the second to-be-modulated bit are determined based on at least one bit of a first to-be-transmitted bit stream, and the third to-be-modulated bit is determined based on at least one bit of a second to-be-transmitted bit stream; the first to-be-modulated bit and the second to-be-modulated bit belong to a first to-be-transmitted bit stream, and the third to-be-modulated bit belongs to a second to-be-transmitted bit stream; the first to-be-modulated bit and the second to-be-modulated bit are determined based on at least one bit of a first to-be-transmitted bit stream, and the third to-be-modulated bit belongs to a second to-be-transmitted bit stream; or the first to-be-modulated bit and the second to-be-modulated bit belong to a first to-be-transmitted bit stream, and the third to-be-modulated bit is determined based on at least one bit of a second to-be-transmitted bit stream, where a code rate of the first to-be-transmitted bit stream is different from a code rate of the second to-be-transmitted bit stream;

a modulation scheme of the first to-be-transmitted bit stream is different from a modulation scheme of the second to-be-transmitted bit stream; and/or spectral efficiency of the first to-be-transmitted bit stream is different from spectral efficiency of the second to-be-transmitted bit stream.

Optionally, the modulation scheme of the second to-be-transmitted bit stream is phase shift keying PSK.

According to a fifth aspect, a communication apparatus is provided. The communication apparatus includes a processor, configured to implement a function of a transmit end device in the method described in the first aspect. The communication apparatus may further include a memory, the memory is coupled to the processor, and the processor is configured to implement the function of the transmit end device in the method described in the first aspect. In a possible implementation, the memory is configured to store program instructions and data. The memory is coupled to the processor. The processor may invoke and execute the program instructions stored in the memory, to implement the function of the transmit end device in the method described in the first aspect. The communication apparatus may further include a communication interface, and the communication interface is used by the communication apparatus to communicate with another device. For example, the communication interface is a transceiver, an interface, a circuit, or the like, and the another device is a receive end device.

In a possible design, the communication apparatus includes a processor and a communication interface, where the processor is configured to:

determine $P_1$ first symbols based on a first to-be-modulated bit, where $P_1=M\times N_1$, $N_1$ is a quantity of resource units used to carry the $P_1$ first symbols, M is a positive integer, and $N_1$ is an integer greater than 1;

determine a second constellation point based on a second to-be-modulated bit, where the second constellation point corresponds to $P_2$ second symbols, $P_2=M\times N_2$, and $N_2$ is an integer greater than 1; and determine $P_3$ third symbols based on the $P_1$ first symbols and the $P_2$ second symbols, where $P_3=M\times N_3$, $N_3$ is a quantity of resource units used to carry the $P_3$ third symbols, and $N_3$ is less than or equal to $N_2$; and the processor sends the $P_1$ first symbols and the $P_3$ third symbols through the communication interface.

$N_2$ may be understood as a quantity of resource units used to carry the $P_2$ second symbols.

Optionally, the communication interface is not configured to send demodulation reference signals of the $P_1$ first symbols and demodulation reference signals of the $P_3$ third symbols.

Optionally, $N_2=N_3$ and $P_2=P_3$; and the $P_1$ first symbols are carried on the $N_1$ resource units, the $P_3$ third symbols are carried on the $N_3$ resource units, the $P_1$ first symbols and the $P_3$ third symbols include $P_4$ overlapping symbols, the $N_1$ resource units and the $N_3$ resource units include $N_4$ overlapping resource units, the $P_4$ symbols are carried on the $N_4$ resource units, and the $P_3$ third symbols have a linear relationship with the $P_2$ second symbols, where $P_4=M \times N_4$, and $N_4$ is an integer greater than or equal to 1 and less than or equal to M.

Optionally, $N_3=N_2-N_4$ and $P_3=P_2-P_4$; and the $P_1$ first symbols are carried on the $N_1$ resource units, the $N_1$ resource units include $N_4$ resource units used to carry $P_4$ symbols, the $P_3$ third symbols are carried on the $N_3$ resource units, and $P_2$ third symbols including the $P_4$ symbols and the $P_3$ third symbols have a linear relationship with the $P_2$ second symbols, where $P_4=M \times N_4$, and $N_4$ is an integer greater than or equal to 1 and less than or equal to M.

Optionally, the processor is specifically configured to:

perform linear transformation on the $P_2$ second symbols based on the $P_4$ symbols and $P_4$ second symbols in the $P_2$ second symbols, to determine the $P_3$ third symbols.

Optionally, $N_4=M$.

Optionally, $N_2=N_3$;

the processor is specifically configured to:

determine a first constellation point based on the first to-be-modulated bit, where the first constellation point corresponds to $P_1$ fifth symbols; and perform, by using a matrix $T_1$, linear transformation on a matrix including the $P_1$ fifth symbols, to determine the $P_1$ first symbols; and the processor is further specifically configured to:

perform, by using a matrix $T_2$, linear transformation on a matrix including the $P_2$ second symbols, to determine the $P_3$ third symbols, where the matrix $T_2$ and the matrix $T_1$ satisfy any one of the following: $C_1=T_1T_2^{-1}$, $C_1=T_1^{-1}T_2$, $C_1=T_2T_1^{-1}$, or $C_1T_2^{-1}T_1$, where the matrix $C_1$ is a matrix with M rows and M columns, and a symbol including the matrix $C_1$ is determined based on a third to-be-modulated bit.

Optionally, the $P_1$ first symbols are carried on the $N_1$ resource units, the $P_3$ third symbols are carried on the $N_3$ resource units, and the $N_1$ resource units are adjacent to the $N_3$ resource units in time domain or frequency domain.

Optionally, the first to-be-modulated bit and the second to-be-modulated bit are determined based on at least one bit of a first to-be-transmitted bit stream, and the third to-be-modulated bit is determined based on at least one bit of a second to-be-transmitted bit stream; the first to-be-modulated bit and the second to-be-modulated bit belong to a first to-be-transmitted bit stream, and the third to-be-modulated bit belongs to a second to-be-transmitted bit stream; the first to-be-modulated bit and the second to-be-modulated bit are determined based on at least one bit of a first to-be-transmitted bit stream, and the third to-be-modulated bit belongs to a second to-be-transmitted bit stream; or the first to-be-modulated bit and the second to-be-modulated bit belong to a first to-be-transmitted bit stream, and the third to-be-modulated bit is determined based on at least one bit of a second to-be-transmitted bit stream, where a code rate of the first to-be-transmitted bit stream is different from a code rate of the second to-be-transmitted bit stream;

a modulation scheme of the first to-be-transmitted bit stream is different from a modulation scheme of the second to-be-transmitted bit stream; and/or spectral efficiency of the first to-be-transmitted bit stream is different from spectral efficiency of the second to-be-transmitted bit stream.

Optionally, the modulation scheme of the second to-be-transmitted bit stream is phase shift keying PSK.

According to a sixth aspect, a communication apparatus is provided. The communication apparatus includes a processor, configured to implement a function of a receive end device in the method described in the second aspect. The communication apparatus may further include a memory, the memory is coupled to the processor, and the processor is configured to implement the function of the receive end device in the method described in the second aspect. In a possible implementation, the memory is configured to store program instructions and data. The memory is coupled to the processor. The processor may invoke and execute the program instructions stored in the memory, to implement the function of the receive end device in the method described in the second aspect. The communication apparatus may further include a communication interface, and the communication interface is used by the communication apparatus to communicate with another device. For example, the communication interface is a transceiver, an interface, a circuit, or the like, and the another device is a transmit end device.

In a possible design, the communication apparatus includes a processor and a communication interface, where the processor receives $P_1$ first symbols and $P_3$ third symbols through the communication interface, where $P_1=M \times N_1$, the $P_1$ first symbols are based on a first to-be-modulated bit, $P_3=M \times N_3$, the $P_3$ third symbols are determined based on the $P_1$ first symbols and $P_2$ second symbols, the $P_2$ second symbols are determined based on a second to-be-modulated bit, $P_2=M \times N_2$, M is a positive integer, $N_1$ is a quantity of resource units used to carry the $P_1$ first symbols, $N_1$ is an integer greater than 1, $N_2$ is an integer greater than 1, $N_3$ is a quantity of resource units used to carry the $P_3$ third symbols, and $N_3$ is less than or equal to $N_2$; and the processor is configured to determine the first to-be-modulated bit and the second to-be-modulated bit based on the $P_1$ first symbols and the $P_3$ third symbols.

Optionally, the communication interface is not configured to receive demodulation reference signals of the $P_1$ first symbols and demodulation reference signals of the $P_3$ third symbols.

Optionally, $N_2=N_3$ and $P_2=P_3$; and the $P_1$ first symbols are carried on the $N_1$ resource units, the $P_3$ third symbols are carried on the $N_3$ resource units, the $N_1$ resource units and the $N_3$ resource units include $N_4$ overlapping resource units, the $P_1$ first symbols and the $P_3$ third symbols include $P_4$ overlapping symbols, the $P_4$ symbols are carried on the $N_4$ resource units, and the $P_3$ third symbols have a linear relationship with the $P_2$ second symbols, where $P_4=M \times N_4$, and $N_4$ is an integer greater than or equal to 1 and less than or equal to M.

Optionally, $\overline{X}_2=A_1B_2X_2$, where the matrix $X_2$ is a matrix including the $P_2$ second symbols, the matrix $X_2$ is a matrix with M rows and $N_2$ columns, the matrix $\overline{X}_2$ is a matrix including the $P_3$ third symbols, the matrix $\overline{X}_2$ is a matrix with M rows and $N_2$ columns, the matrix $B_2$ is a matrix including $P_4$ second symbols in the $P_2$ second symbols, the matrix $B_2$ is a matrix with M rows and $N_4$ columns, the matrix $A_1$ is a matrix including the $P_4$ symbols, and the matrix $A_1$ is a matrix with M rows and $N_4$ columns.

Optionally, $N_3=N_2-N_4$ and $P_3=P_2-P_4$; and the $P_1$ first symbols are carried on the $N_1$ resource units, the $N_1$ resource units include $N_4$ resource units used to carry $P_4$ symbols, the $P_3$ third symbols are carried on the $N_3$ resource units, and $P_2$ third symbols including the $P_4$ symbols and the $P_3$ third symbols have a linear relationship with the $P_2$ second symbols, where $P_4=M\times N_4$, and $N_4$ is an integer greater than or equal to 1 and less than or equal to M.

Optionally, $\overline{X}_2=A_1B_2X_2$, where the matrix $X_2$ is a matrix including the $P_2$ second symbols, the matrix $X_2$ is a matrix with M rows and $N_2$ columns, the matrix $\overline{X}_2$ is a matrix including the $P_2$ third symbols, the matrix $\overline{X}_2$ is a matrix with M rows and $N_2$ columns, the matrix $A_1$ is a matrix including the $P_4$ symbols, the matrix $A_1$ is a matrix with M rows and $N_4$ columns, the matrix $B_2$ is a matrix including $P_4$ second symbols in the $P_2$ second symbols, the matrix $B_2$ is a matrix with M rows and $N_4$ columns, and symbols corresponding to a matrix $(\overline{X}_2-A_1)$ are the $P_3$ third symbols.

Optionally, $N_4=M$.

Optionally, $N_2=N_3$;

$\overline{X}_1=T_1X_1$, where the matrix $X_1$ is a matrix including $P_1$ fifth symbols corresponding to a first constellation point, the first constellation point is determined based on the first to-be-modulated bit, the matrix $X_1$ is a matrix with M rows and $N_1$ columns, the matrix $T_1$ is a matrix with M rows and M columns, and the matrix $\overline{X}_1$ is a matrix including the $P_1$ first symbols;

$\overline{X}_2=T_2X_2$, where the matrix $X_2$ is a matrix including the $P_2$ second symbols, the matrix $X_2$ is a matrix with M rows and $N_2$ columns, the matrix $\overline{X}_2$ is a matrix including the $P_3$ third symbols, the matrix $T_2$ and the matrix $T_1$ satisfy any one of the following: $C_1=T_1T_2^{-1}$, $C_1=T_1^{-1}T_2$, $C_1=T_2T_1^{-1}$, or $C_1=T_2^{-1}T_1$, the matrix $T_2$ is a matrix with M rows and M columns, the matrix $C_1$ is a matrix with M rows and M columns, and a symbol including the matrix is $C_1$ determined based on a third to-be-modulated bit; and the processor is specifically configured to:

determine the first to-be-modulated bit, the second to-be-modulated bit, and the third to-be-modulated bit based on the $P_1$ first symbols and the $P_3$ third symbols.

Optionally, the $P_1$ first symbols are carried on the $N_1$ resource units, the $P_3$ third symbols are carried on the $N_3$ resource units, and the $N_1$ resource units are adjacent to the $N_3$ resource units in time domain or frequency domain.

Optionally, the first to-be-modulated bit and the second to-be-modulated bit are determined based on at least one bit of a first to-be-transmitted bit stream, and the third to-be-modulated bit is determined based on at least one bit of a second to-be-transmitted bit stream; the first to-be-modulated bit and the second to-be-modulated bit belong to a first to-be-transmitted bit stream, and the third to-be-modulated bit belongs to a second to-be-transmitted bit stream; the first to-be-modulated bit and the second to-be-modulated bit are determined based on at least one bit of a first to-be-transmitted bit stream, and the third to-be-modulated bit belongs to a second to-be-transmitted bit stream; or the first to-be-modulated bit and the second to-be-modulated bit belong to a first to-be-transmitted bit stream, and the third to-be-modulated bit is determined based on at least one bit of a second to-be-transmitted bit stream, where a code rate of the first to-be-transmitted bit stream is different from a code rate of the second to-be-transmitted bit stream;

a modulation scheme of the first to-be-transmitted bit stream is different from a modulation scheme of the second to-be-transmitted bit stream; and/or spectral efficiency of the first to-be-transmitted bit stream is different from spectral efficiency of the second to-be-transmitted bit stream.

Optionally, the modulation scheme of the second to-be-transmitted bit stream is phase shift keying PSK.

According to a seventh aspect, an embodiment of this application further provides a computer-readable storage medium, including instructions. When the instructions are run on a computer, the computer is enabled to perform the method according to any possible design of the first aspect or the second aspect.

According to an eighth aspect, an embodiment of this application further provides a computer program product, including instructions. When the instructions are run on a computer, the computer is enabled to perform the method according to any possible design of the first aspect or the second aspect.

According to a ninth aspect, an embodiment of this application provides a chip system. The chip system includes a processor, and may further include a memory, configured to implement the method according to any possible design of the first aspect or the second aspect. The chip system may include a chip, or may include the chip and another discrete component.

According to a tenth aspect, an embodiment of this application provides a system. The system includes the apparatus according to the fifth aspect and the apparatus according to the sixth aspect, or includes the apparatus according to the third aspect and the apparatus according to the fourth aspect.

DESCRIPTION OF EMBODIMENTS

Figure 1:
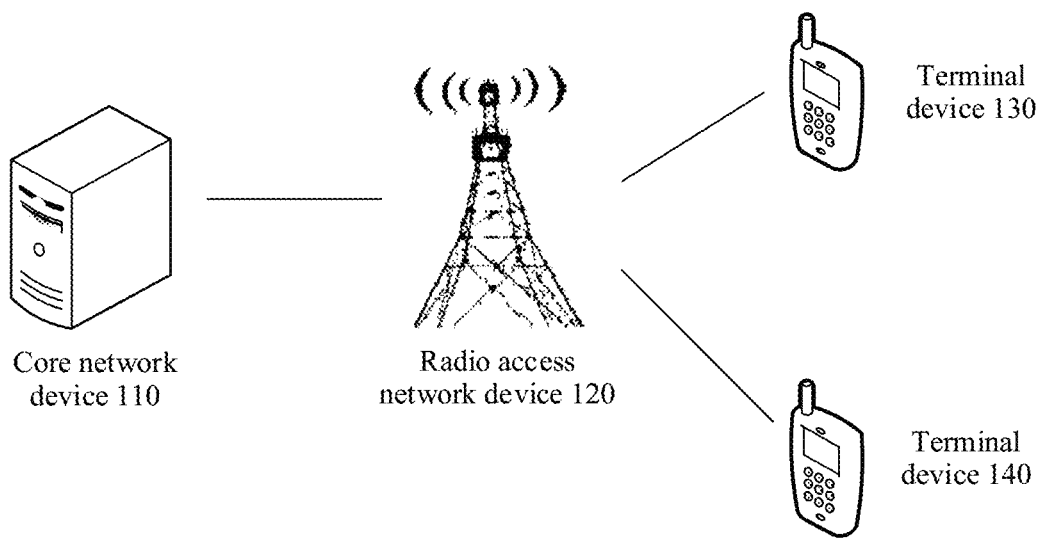
FIG. 1 is a schematic architectural diagram of a mobile communication system applicable to an embodiment of this application.

The following describes technical solutions in embodiments of this application with reference to the accompanying drawings.

In the embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually represents an "or" relationship between the associated objects. "At least a part" may be all or a part. For example, "at least a part of B in A" may represent all B in A, or may represent a part of B in A. "At least one of the following items (pieces)" or a similar expression thereof means any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. "A belongs to B" may indicate that A is a subset of B, or may indicate that content of A is the same as content of B. "A includes B" may indicate that B is a subset of A, or may indicate that content of A is the same as content of B, or "A includes B" may indicate that A includes B and other content, or may indicate that A includes only B.

In the embodiments of this application, "first", "second", "third", "A", "B", "C", "D", and the like are used for distinguishing between technical features described by them. There is no chronological order or no size order between the technical features described by "first", "second", "third", "A", "B", "C", and "D".

The technical solutions of the embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD), a universal mobile telecommunications system (UMTS), a worldwide interoperability for microwave access (WiMAX) communication system, or a 5th generation (5G) system. 5G may also be referred to as new radio (NR).

The technical solutions provided in the embodiments of this application can be applied to wireless communication between communication devices. The communication devices may include a network device and a terminal device. The wireless communication between communication devices may include, but not limited to, wireless communication between a network device and a terminal device, wireless communication between network devices, and wireless communication between terminal devices. In the embodiments of this application, the term "wireless communication" may be referred to as "communication" for short, and the term "communication" may also be described as "data transmission", "signal transmission", "information transmission", "transmission", or the like. In the embodiments of this application, the transmission may include sending or receiving. For example, the transmission may be uplink transmission. For example, the terminal device may send a signal to the network device. The transmission may alternatively be downlink transmission. For example, the network device may send a signal to the terminal device. In the embodiments of this application, the wireless communication between communication devices may be described as: A transmit end sends a signal to a receive end, and the receive end receives the signal from the transmit end.

The terminal device in the embodiments of this application may also be referred to as a terminal, and may be a device with a wireless transceiver function. The terminal may be deployed on land, including an indoor or outdoor device, a handheld device, or a vehicle-mounted device, or may be deployed on a water surface (for example, on a ship), or may be deployed in air (for example, on an aircraft, a balloon, or a satellite). The terminal device may be user equipment (UE). The UE includes a handheld device, vehicle-mounted device, wearable device, or computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, an apparatus configured to implement a terminal function may be a terminal, or may be an apparatus, for example, a chip system, that can support the terminal in implementing the function. The apparatus may be mounted in the terminal. In the embodiments of this application, the chip system may include a chip, or may include the chip and another discrete component. In the technical solutions provided in the embodiments of this application, an example in which an apparatus for implementing a terminal function is a terminal may be used to describe the technical solutions provided in the embodiments of this application.

The network device in the embodiments of this application includes a base station (BS) or an access network device. The base station may be a device that is deployed in a radio access network and that can perform wireless communication with a terminal. The base station may be in a plurality of forms, for example, a macro base station, a micro base station, a relay station, and an access point. For example, the base station in the embodiments of this application may be a base station in 5G or a base station in LTE, and the base station in 5G may also be referred to as a transmission reception point (TRP) or a gNB (gNodeB). In the embodiments of this application, an apparatus configured to implement a network device function may be a network device, or may be an apparatus, for example, a chip system, that can support the network device in implementing the function. The apparatus may be mounted in the network device. In the technical solutions provided in the embodiments of this application, an example in which an apparatus for implementing a network device function is a network device may be used to describe the technical solutions provided in the embodiments of this application.

In some deployments, the gNB may include a centralized unit (CU) and a distributed unit (DU). The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some processing functions of the physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in an access network (RAN), or may be a network device in a core network (CN). This is not limited in this application.

In a possible design, in the embodiments of this application, the apparatus for implementing a terminal device function or the apparatus for implementing a network device function includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not particularly limited in the embodiments of this application, provided that communication can be performed according to the method provided in the embodiments of this application. For example, the method provided in the embodiments of this application may be performed by the terminal device, the network device, or a function module that is in the terminal device or the network device and that can invoke and execute a program.

In addition, aspects or features in the embodiments of this application may be implemented as a method, an apparatus, or a product that uses standard programming and/or engineering technologies. The term "product" used in the embodiments of this application covers a computer program that can be accessed from any computer-readable component, carrier, or medium. For example, the computer-readable medium may include but is not limited to a magnetic storage component (for example, a hard disk drive, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to various other media that can store, contain and/or carry instructions and/or data.

Optionally, FIG. 1 is a schematic architectural diagram of a mobile communication system applicable to an embodiment of this application. As shown in FIG. 1, the mobile communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices independent of each other, or a function of the core network device and a function of the radio access network device may be integrated into one physical device, or a part of functions of the core network device and a part of functions of the radio access network device may be integrated into one physical device. The terminal device may be at a fixed location, or may be mobile. FIG. 1 is only a schematic diagram. The communication system may further include another network device, for example, may further include a wireless relay device and a wireless backhaul device, which are not shown in FIG. 1. Quantities of core network devices, radio access network devices, and terminal devices included in the mobile communication system are not limited in the embodiments of this application.

For ease of understanding, related terms and technologies used in the embodiments of this application are first briefly described.

1. Resource Unit

The resource unit may be used as a measurement unit of a resource in time domain, frequency domain, or time-frequency domain. In the embodiments of this application, the measurement unit of the resource in time-frequency domain may be represented as a resource unit, and the resource unit may be, for example, a resource element (RE) or a resource block (RB).

The RE may also be referred to as a resource element. In a communication system based on orthogonal frequency division multiplexing (OFDM), for example, in LTE or 5G, one RE may correspond to one time domain symbol in time domain, and may correspond to one subcarrier in frequency domain. In the embodiments of this application, a time-frequency resource of the RE may be an example of the resource unit. For example, the time domain symbol may be an orthogonal frequency division multiple access (OFDMA) symbol or a single-carrier frequency division multiple access (SC-FDMA) symbol.

One RB includes $N_{sc}^{RB}$ consecutive subcarriers in frequency domain, where $N_{sc}^{RB}$ is a positive integer. For example, in LTE or 5G, $N_{sc}^{RB}$ may be equal to 12. In the embodiments of this application, the RB may be defined only in frequency domain, that is, a quantity of time domain resources occupied by the RB in time domain is not limited. Alternatively, the RB may be defined in time domain and frequency domain. For example, one RB includes $N_{sc}^{RB}$ consecutive subcarriers in frequency domain and includes a positive integer quantity of time domain symbols in time domain. For example, one RB includes 7, 14, 6, or 12 time domain symbols in time domain. In the embodiments of this application, a time-frequency resource of the RB may be another example of the resource unit.

2. To-be-Transmitted Bit Stream

The to-be-transmitted bit stream includes one or more bits. The to-be-transmitted bit stream may be a bit stream that is currently to be transmitted and on which physical layer bit-level processing has not been performed. The physical layer bit-level processing may include one or more of the following processing: segmentation, concatenation, channel coding, rate matching, scrambling, cyclic redundancy check (CRC) addition, and the like. For example, the to-be-transmitted bit stream may be delivered by a media access control (MAC) layer of a transmit end to a physical layer of the transmit end, or may be an information bit of a physical layer control channel. The transmit end may perform processing such as channel coding, scrambling, or modulation on the to-be-transmitted bit stream. The to-be-transmitted bit stream may be understood as current to-be-transmitted data. The data may be service data, control information carried on a physical layer data channel, or various other control information used for wireless communication. As an example rather than a limitation, the service data may be data carried on a physical uplink shared channel (PUSCH), data carried on a physical downlink shared channel (PDSCH), or the like. As an example rather than of a limitation, the other control information may be information (for example, downlink control information (DCI)) carried on a physical downlink control channel (PDCCH), may be information (for example, uplink control information (UCI)) carried on a physical uplink control channel (PUCCH), or the like. The uplink control information may include but is not limited to an acknowledgment (ACK), a negative acknowledgment (NACK), channel state information (CSI), scheduling request information, beam interruption recovery request information, and the like. The ACK/NACK is used to feed back whether information is correctly received, the CSI is used to feed back information (for example, channel state information, a precoding matrix indication, or a rank indication) related to a channel status, the scheduling request information is used by the terminal device to request a scheduling resource from the network device, and the beam interruption recovery request information is used by the terminal device to report a beam interruption to the network device and request to perform beam interruption recovery.

One to-be-transmitted bit stream may be understood as a transport block (TB), a code block (CB), or a code block group (CBG).

3. Non-Coherent Transmission

In this method, any constellation point in a constellation corresponds to P elements, where P=M*N, M is a quantity of antenna ports used to send to-be-modulated data at one time, N is a quantity of resource units used to send the to-be-modulated data, and N is an integer greater than 1. That is, the constellation point is a constellation point corresponding to at least one antenna port and a plurality of resource units. For the to-be-modulated data, a transmit end device maps the to-be-modulated data to P elements corresponding to one constellation point to generate P elements, and sends the P elements by using M antenna ports and N resource units.

Herein, one element may be understood as one complex-valued modulation symbol (symbol for short), and the P elements are P symbols. For ease of unified description below, elements may be collectively referred to as symbols, and the two expressions may be replaced with each other. In addition, for example, the P elements may be denoted as a matrix with M rows and N columns (M*N) or N rows and M columns (N*M), or the P elements may be denoted as an element group. Certainly, another description method is not excluded in this specification. For example, the P elements may be a sequence whose length is P.

It can be learned from the foregoing descriptions that, compared with a conventional manner of transmitting data based on a reference signal (denoted as coherent transmission), a focus of non-coherent transmission is a modulation process. Modulation in the non-coherent transmission is modulating the to-be-modulated data by using a constellation point corresponding to a plurality of resource units. Modulation in the coherent transmission is modulating the to-be-modulated data by using a constellation point corresponding to one resource unit.

Figure 2:
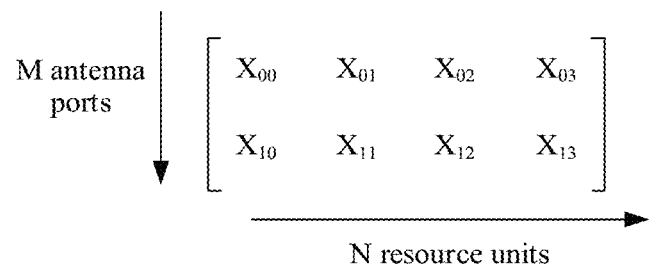
FIG. 2 is a schematic diagram of a constellation point according to an embodiment of this application.

FIG. 2 is a schematic diagram of a constellation point according to an embodiment of this application. As shown in FIG. 2, it is assumed that M=2 and N=4. A matrix corresponding to the constellation point is denoted as X, the matrix X may be an M×N matrix (where certainly, the matrix X may alternatively be an N×M matrix, and the M×N matrix is used as an example herein), and the matrix includes eight symbols. For the M×N matrix, it may be understood that a symbol in an $m^{th}$ row and an $n^{th}$ column in the matrix X is mapped to an $n^{th}$ resource unit, and is sent by using an $m^{th}$ antenna port. m ranges from 0 to 1 (where that is, m is an integer ranging from 0 to 1), and n ranges from 0 to 3 (where that is, n is an integer ranging from 0 to 3).

In non-coherent transmission, a constellation is used to modulate a to-be-modulated bit, and the to-be-modulated bit represents a bit sequence including one or more bits. It is assumed that the to-be-modulated bit includes u bits. Because a value of each bit may be 0 or 1, that is, there are two possible values in total, the u bits may have $2^u$ possible values. Therefore, a constellation corresponding to the u bits includes $2^u$ constellation points, each constellation point corresponds to a plurality of complex-valued modulation symbols, the $2^u$ constellation points one-to-one correspond to the $2^u$ possible bit values, and each bit value represents one possible value of the u bits, where u is a positive integer. In the embodiments of this application, the positive integer may be 1, 2, 3, or a larger integer.

The constellation is not only related to a quantity of bits of the to-be-modulated bit, and the constellation points in the constellation are constellation points corresponding to at least one antenna port and a plurality of resource units.

The to-be-modulated bit including u bits is still used as an example. It is assumed that a quantity of antenna ports used to transmit the to-be-modulated bit is M, and in a resource mapping process, a quantity of resource units used to transmit the to-be-modulated bit is N. Correspondingly, the constellation corresponding to the to-be-modulated bit includes $2^u$ constellation points, and each constellation point corresponds to P symbols, where P=M×N, M is a positive integer (for example, 1, 2, 4, 8, or 16), N is a positive integer greater than 1 (for example, 2, 4, 6, or 8), and P is a positive integer greater than 1. Based on a relationship between the to-be-modulated bit and the constellation, the transmit end device may determine, based on the quantity u of bits, a constellation point corresponding to u in the constellation, so that a modulation process for the to-be-modulated bit is implemented to obtain modulated P symbols.

In the conventional coherent transmission, one constellation point corresponds to one symbol, and a to-be-modulated bit is carried by using one symbol. In the non-coherent transmission, a to-be-modulated bit is carried in a direction of a matrix X corresponding to P symbols. Alternatively, when the matrix X is represented as an M×N matrix, it may be understood as that the to-be-modulated bit is carried by using a space generated by using row vectors of the matrix X. That is, spaces generated by using row vectors of matrices corresponding to different constellation points in a constellation are different. Therefore, spaces corresponding to different to-be-modulated bits are also different. Specifically, matrices corresponding to two constellation points in a constellation are respectively denoted as $X_1$ and $X_2$, where $X_1$ and $X_2$ are each an M×N matrix, and a space generated by using row vectors of $X_1$ is different from a space generated by using row vectors of $X_2$. Therefore, it means that an M×M square matrix T enabling $X_1=TX_2$ does not exist, because left-multiplying $X_2$ by the matrix T may be understood as linear transformation of $X_2$. $X_2$ may become $X_1$ through linear transformation when T exists, and the spaces generated by using the row vectors of $X_1$ and $X_2$ are the same. Therefore, in a constellation of non-coherent transmission, a matrix T used to perform linear transformation on a matrix corresponding to one of any two constellation points does not exist.

Such constellation design satisfies a characteristic of the non-coherent transmission: The transmit end device does not need to send a reference signal, and the receive end device does not need to demodulate data based on the reference signal. Specifically, assuming that channels corresponding to the N resource units are approximately the same, when the P symbols in the matrix X corresponding to the constellation point are transmitted on the channels, for the receive end device, for example, received symbols may be denoted as Y=HX+W, where H is an S×M-dimensional matrix and represents channel state information (CSI) of the channels, W is an S×N-dimensional matrix and represents noise, and S is a positive integer. It can be learned that multiplying X by H is linear transformation performed on X. Because linear transformation performed on a matrix does not change a space generated by using row vectors, a space generated by using row vectors of HX and a space generated by using row vectors of X may be considered as a same space, that is, it may be understood as that a channel state represented by HX is the same as a channel state represented by X. Therefore, the receive end device can obtain the space generated by using the row vectors of X without needing to know the channel state information (namely, H), to obtain a to-be-modulated bit based on X.

For example, a manner of demodulating data by the receive end device is briefly described by using a generalized likelihood ratio test (GLRT) receiver as an example. It should be understood that the receive end device may alternatively demodulate the data in another manner. This is not limited herein.

It is assumed that the transmit end device sends P symbols generated based on a to-be-modulated bit, and the P symbols form a matrix X. The symbols received by the receive end device may be represented as Y=HX+W, where the matrix H is an S×M-dimensional matrix and represents CSI of a channel used to transmit the P symbols, the matrix W is an S×N-dimensional matrix and represents noise in the channels, X represents the P symbols, X is an M×N matrix, M is a quantity of antenna ports used to transmit the to-be-modulated bit or the P symbols, and N is a quantity of resource units used to transmit the to-be-modulated bit or the P symbols.

For ease of description, a matrix corresponding to an $i^{th}$ constellation point in the constellation corresponding to the to-be-modulated bit is denoted as $X_i$, where a value range of i is [1, $2^u$], $2^u$ is a quantity of constellation points included in the constellation, and u is a quantity of bits of a to-be-modulated bit carried on resource units corresponding to each constellation point. The receive end device may calculate, based on the following formula, a distance $d_i$ between the matrix corresponding to the P symbols and the matrix corresponding to the $i^{th}$ constellation point:

$$d_i = \sqrt[j]{M - \text{trace}(X_i \times Y^H \times Y \times H_i^H)},$$

where trace represents a trace of the matrix $X_i \times Y^H \times Y \times H_i^H$, $Y^H$ represents a conjugate transpose of the matrix Y, $X_i^H$ represents a conjugate transpose of $X_i$, and S is a positive integer.

Based on the foregoing formula, a distance between the matrix corresponding to the P symbols and a matrix corresponding to each of the $2^u$ constellation points is calculated by setting i to 1 to $2^u$, to obtain $2^u$ distances $d_i$. P symbols in a matrix $X_i$ corresponding to a smallest distance $d_i$ are considered as P symbols detected by the receive end device. In this way, the receive device may determine, based on a correspondence between a constellation point corresponding to the detected P symbols and a bit value, that a bit value corresponding to the matrix $X_i$ is data obtained through demodulating the P symbols.

For example, the quantity u of bits of the to-be-modulated bit is 2, M=1, N=4, S=1, W=[w1, w2, w3, w4], W is a 1×4 vector, and H is a scalar. The constellation includes four constellation points, and matrices corresponding to the four constellation points are:

$X_1$=[1, 1, 1, 1], corresponding to a bit value 00;
$X_2$=[1, 1, −1, −1], corresponding to a bit value 01;
$X_3$=[1, −1, 1, −1], corresponding to a bit value 10; and
$X_4$=[1, −1, −1, 1], corresponding to a bit value 11.

It is assumed that to-be-modulated bits sent by the transmit end device are 01, and i=2. The to-be-modulated bits correspond to the transmit matrix $X_2$. After the matrix is transmitted through the channel H, symbols received by the receive end device are Y=[H+w1, H+w2, −H+w3, −H+w4]. After receiving Y, the transmit end device sets i to 1 to 4 (where to be specific, starting from 1, i is set to 1 to 4, that is, i is equal to 1, 2, 3, and 4). The foregoing four matrices are separately substituted into the formula $d_i = \sqrt[j]{M - \text{trace}(X_i \times Y^H \times Y \times H_i^H)}$, to obtain four $d_i$ values corresponding to the four $X_i$. For example, $d_1$=0.6 (corresponding to the matrix $X_1$), $d_2$=0.1 (corresponding to the matrix $X_2$), $d_3$=0.5 (corresponding to the matrix $X_3$), and $d_4$=0.9 (corresponding to the matrix $X_4$), where $d_2$ is the smallest. The receive end device may determine that the received P symbols are symbols in the matrix $X_2$. Therefore, the receive end device obtains the bit value 01 based on a mapping relationship between the matrix $X_2$ and the bit value, to obtain the to-be-modulated bits through demodulation.

To a degree, $d_i$ may represent a value of a distance between subspaces generated by using row vectors of two matrices, and the two matrices represent the matrix (for example, the matrix Y) corresponding to the P symbols received by the receive end device and the matrix (for example, $X_i$) corresponding to the $i^{th}$ constellation point in the constellation. A larger value of $d_i$ indicates a larger subspace distance, a smaller value of $d_i$ indicates closer subspaces, and $d_i$=0 may indicate that the two subspaces are the same. Therefore, a symbol in a matrix corresponding to $d_i$ indicating a smallest distance is used as a received symbol.

As described above, linear transformation is performed by using any matrix T on the matrix X corresponding to the constellation point, data carried by the constellation point does not change, where T is a matrix with M rows and M columns. Therefore, even if linear transformation is performed on the matrix X by using the matrix T, for the receive end device, symbols that are actually received are Y=HTX+W. The receive end device may obtain X, Y, and W. Because H is not known, the receive end device cannot know the matrix TX, so that data carried on the matrix T is meaningless, or it may be considered that the matrix T cannot carry data. In this case, for one antenna port, M degrees of freedom is lost, that is, M resource units are lost, or data carried on the M resource units is lost.

Therefore, the embodiments of this application provide a communication method. A plurality of to-be-modulated bits are determined based on a to-be-transmitted bit stream, and the to-be-modulated bits are modulated by using constellation points corresponding to a plurality of resource units, to obtain a group of symbols corresponding to each to-be-modulated bit. A plurality of groups (for example, two or three groups) of symbols are associated, to determine symbols that are actually sent, so that wasted degrees of freedom in non-coherent transmission can be reduced, to improve resource utilization.

For example, in a first idea, in non-coherent transmission, due to a characteristic that linear transformation is performed on a matrix including symbols corresponding to a constellation point without changing data carried on the constellation point, a group of symbols on which resource mapping has been performed and a group of to-be-mapped symbols are used to perform linear transformation on a matrix including the group of to-be-mapped symbols, so that at least one symbol in the group of to-be-mapped symbols obtained after linear transformation is performed is equal to at least one symbol in the group of mapped symbols. That is, the group of to-be-mapped symbols obtained after linear transformation is performed and the group of mapped symbols have an overlapping symbol. In this way, a symbol other than the overlapping symbol in the group of to-be-mapped symbols obtained after linear transformation is performed may be mapped to a resource, so that resources that originally carry symbols whose quantity is equal to a quantity of overlapping symbols are saved, wasted degrees of freedom in non-coherent transmission is reduced, and resource utilization is improved.

For example, in a second idea, in non-coherent transmission, due to the characteristic that linear transformation is performed on a matrix including symbols corresponding to a constellation point without changing data carried on the constellation point, linear transformation is performed on a matrix including each group of symbols, and data is carried in a differential manner between matrices used to perform linear transformation. In a same resource condition, more data can be carried, thereby reducing wasted degrees of freedom in non-coherent transmission, and improving resource utilization.

Figure 3:
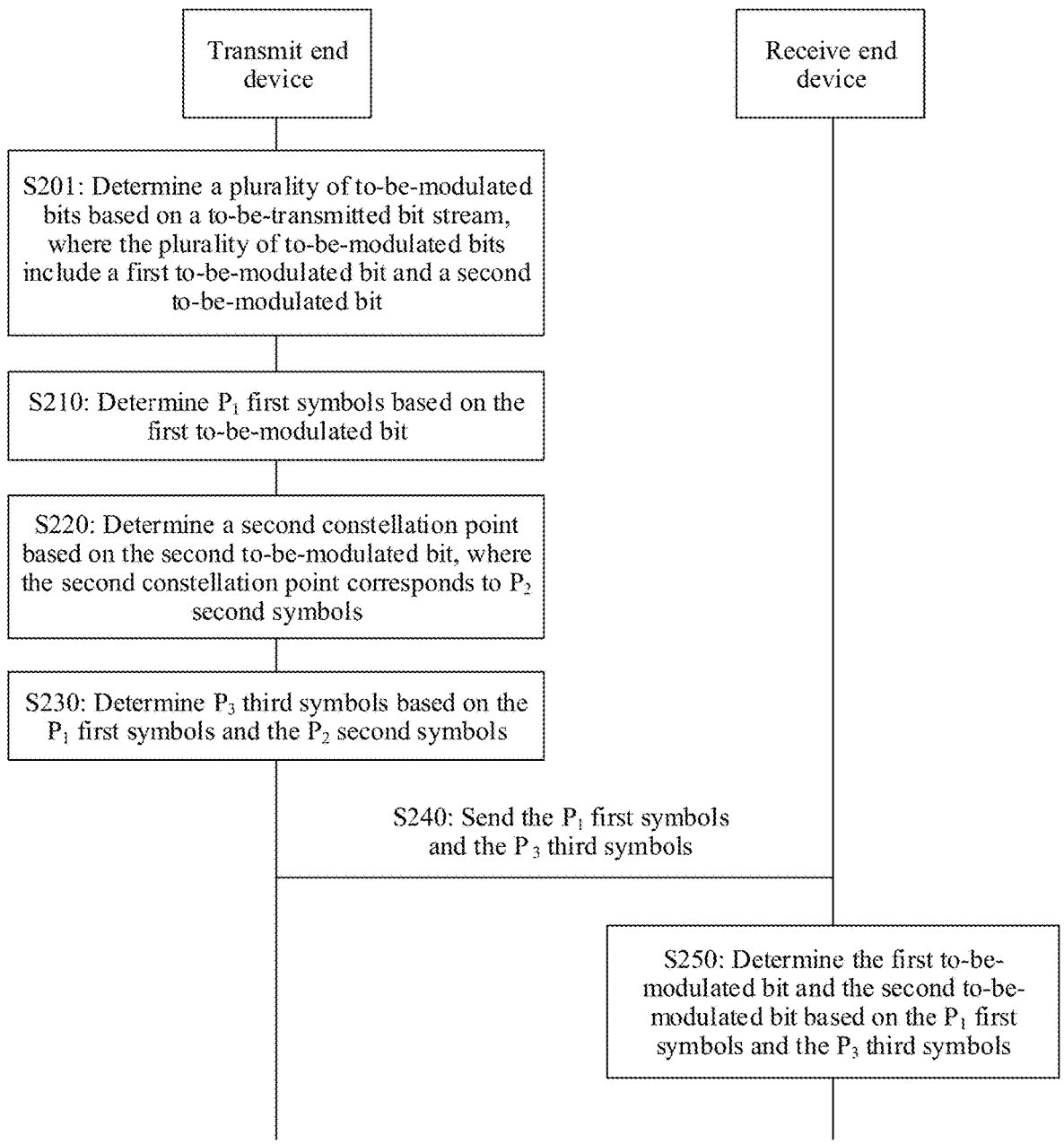
FIG. 3 is a schematic interaction diagram of a communication method according to an embodiment of this application.
Figure 4:
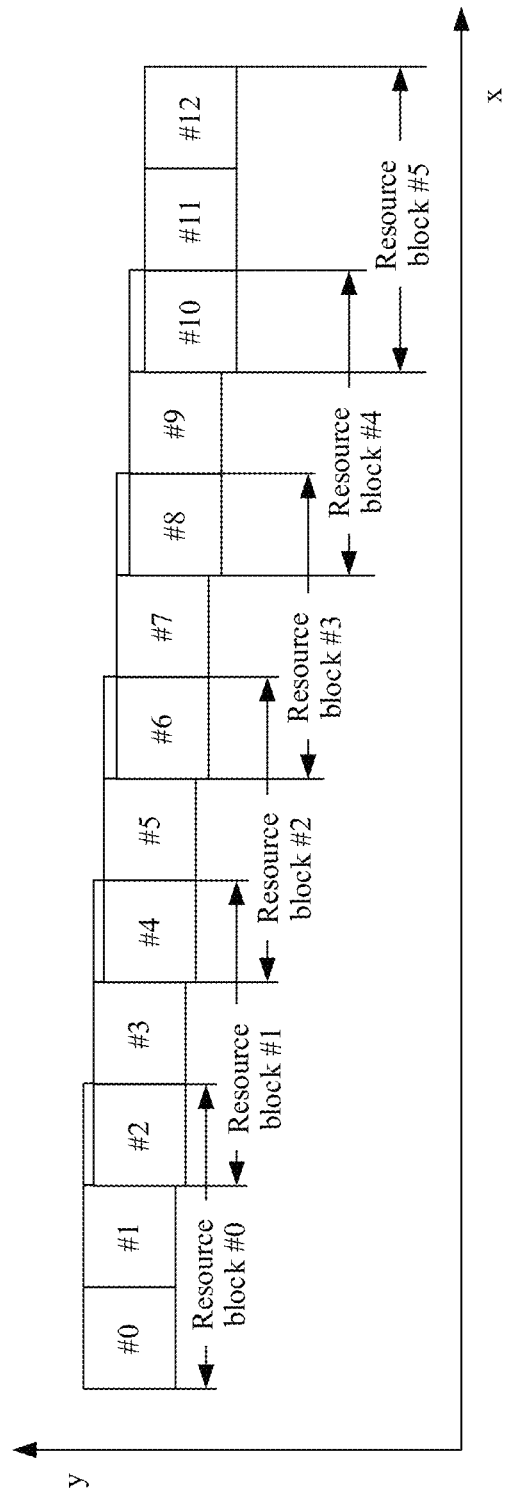
FIG. 4 is a schematic diagram of a relationship among a plurality of modulation resource blocks according to an embodiment of this application.
Figure 5:
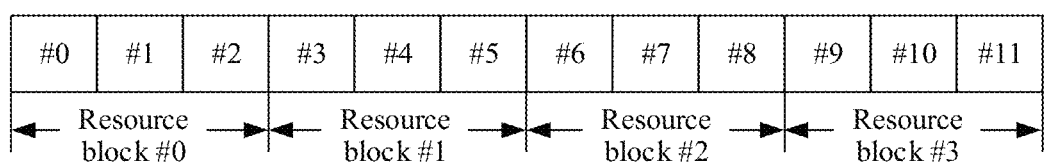
FIG. 5 is another schematic diagram of a relationship among a plurality of modulation resource blocks according to an embodiment of this application.

The following describes the embodiments of this application in detail with reference to FIG. 3 to FIG. 5. All methods in the embodiments of this application are applicable to uplink transmission and downlink transmission, are applicable to communication between network devices such as a macro base station and a micro base station, and are also applicable to device-to-device (D2D) communication between terminal devices. For ease of description, a transmit end device and a receive end device are used as execution bodies of the embodiments of this application. The transmit end device generates and sends a symbol, and the receive end device receives and demodulates the symbol. In a possible application scenario, the transmit end device may be an apparatus that can perform the embodiments of this application, for example, a network device or a chip disposed in the network device. Correspondingly, the receive end device is an apparatus that can perform the embodiments of this application, for example, a terminal device or a chip disposed in the terminal device. Alternatively, the transmit end device may be an apparatus that can perform the embodiments of this application, for example, a terminal device or a chip disposed in the terminal device. Correspondingly, the receive end device is an apparatus that can perform the embodiments of this application, for example, a network device or a chip disposed in the network device.

S201: A transmit end device determines a plurality of to-be-modulated bits based on a to-be-transmitted bit stream.

In actual communication, to improve a throughput, a large quantity of resources are used to transmit the to-be-transmitted bit stream. For example, the resources include 50 resource units (for example, REs). The resources used to transmit the to-be-transmitted bit stream may be preconfigured, or may be scheduled by a network device for a terminal device, for example, may be sent to the terminal device by using DCI. This is not limited in the embodiments of this application. Due to reasons such as delay spread and movement of the terminal device, channels change in both a time domain dimension and a frequency domain dimension, that is, channels on different symbols or different subcarriers are not completely the same. For example, if the delay spread is large, the channels rapidly change in frequency domain. In other words, a difference between channel values of two resource units spaced by a small quantity of subcarriers (for example, 12 subcarriers) is large. For another example, if a moving speed of the terminal device is high, a difference between channel values of resource units spaced by a small quantity of time domain symbols (for example, four time domain symbols) is large.

Generally, if a large quantity of resources are used to transmit the to-be-transmitted bit stream, channel values of resource units included in the resources cannot be approximately the same provided that there is small delay spread or a low moving speed. If the to-be-transmitted bit stream or a bit stream obtained through performing channel coding and/or scrambling processing on the to-be-transmitted bit stream is directly modulated on the resources and a modulated symbol pair is sent, transmission performance of non-coherent transmission is affected. Therefore, when a large quantity of resources are used to transmit the to-be-transmitted bit stream, the resources may be divided into a plurality of resource blocks, and each resource block includes a plurality of resource units, so that channels of resource units included in each resource block should be as same as possible. In this embodiment of this application, a resource block is resource units corresponding to a constellation point in a modulation process. For ease of understanding, the resource block may be referred to as a modulation resource block. The modulation resource block is used below for description.

Correspondingly, the transmit end device may determine the plurality of to-be-modulated bits based on the to-be-transmitted bit stream. In a possible implementation, the to-be-modulated bits are modulated in a unit of a modulation resource block in a modulation process, and one modulation resource block is used to transmit one to-be-modulated bit. In another possible implementation, two modulation resource blocks may be used to transmit three to-be-modulated bits. For specific descriptions, refer to the following descriptions.

A manner in which the transmit end device determines the plurality of to-be-modulated bits based on the to-be-transmitted bit stream is described below by using examples.

In a possible implementation, the to-be-transmitted bit stream may be divided into a plurality of groups, each group includes at least one bit, one group of bits or bits obtained through performing channel coding and/or scrambling processing on the group of bits are used as one to-be-modulated bit, a symbol obtained through modulating each to-be-modulated bit is mapped to a corresponding modulation resource block, and finally the symbol is sent to a receive end device, to complete non-coherent transmission of the entire to-be-transmitted bit stream.

In another possible implementation, a bit stream obtained through performing channel coding and/or scrambling processing on the to-be-transmitted bit stream may be divided into a plurality of groups, each group includes at least one bit, one group of bits are used as one to-be-modulated bit, a symbol obtained through modulating each to-be-modulated bit is mapped to a corresponding modulation resource block, and finally the symbol is sent to a receive end device, to complete non-coherent transmission of the entire to-be-transmitted bit stream.

Any two of the plurality of to-be-modulated bits may include a same quantity of bits or different quantities of bits. This is not limited in this embodiment of this application.

For example, the transmit end device may determine, based on coherence bandwidth and/or coherence time, a quantity of resource units included in one modulation resource block. It may be understood that channel values of resources within a range of the coherence bandwidth and/or coherence time may be considered to be approximately the same. For example, if the coherence bandwidth is greater than one RB, and the coherence time is greater than two time domain symbols, a resource scheduled by the network device for transmitting a to-be-transmitted bit stream at one time includes 24 REs, and the 24 REs include two time domain symbols and one RB. In this case, the resource may be divided into 16 modulation resource blocks, and each modulation resource block includes 24 REs including two time domain symbols and one RB. It may be approximately considered that channel values of resources in one modulation resource block are approximately the same, to ensure performance of non-coherent transmission as much as possible.

In the following descriptions, for ease of description, two (for example, a first to-be-modulated bit and a second to-be-modulated bit) or three (for example, the first to-be-modulated bit, the second to-be-modulated bit, and a third to-be-modulated bit) of the plurality of to-be-modulated bits are used as examples to describe the embodiments of this application. A manner of implementing non-coherent transmission based on any two or three other to-be-modulated bits is similar to a manner of implementing non-coherent transmission based on the two or three to-be-modulated bits in this specification.

S210: The transmit end device determines $P_1$ first symbols based on the first to-be-modulated bit in the plurality of to-be-modulated bits, where $P_1=M \times N_1$, $N_1$ is a quantity of resource units used to carry the $P_1$ first symbols, M is a positive integer, and $N_1$ is an integer greater than 1.

M is a quantity of antenna ports used to transmit the to-be-transmitted bit stream. Alternatively, for a modulated symbol, M may also be understood as a quantity of antenna ports used to transmit the $P_1$ first symbol and the following $P_3$ third symbols at one time.

The $P_1$ first symbols may be symbols corresponding to a first constellation point determined based on the first to-be-modulated bit, or may be symbols obtained after linear transformation is performed on symbols corresponding to the first constellation point. For specific descriptions, refer to the following descriptions. For a process of determining the first constellation point based on the first to-be-modulated bit, refer to the foregoing related descriptions. Details are not described herein again.

S220: The transmit end device determines a second constellation point based on the second to-be-modulated bit in the plurality of to-be-modulated bits, where the second constellation point corresponds to $P_2$ second symbols, $P_2=M \times N_2$, and $N_2$ is an integer greater than 1.

$N_2$ may be understood as a quantity of resource units used to carry the $P_2$ second symbols.

It should be understood that the explanation of $N_2$ represents only a function explanation of $N_2$, and does not mean that the transmit end device necessarily performs an action of sending the $P_2$ second symbols by using the $N_2$ resource units. Similarly, explanations of $N_1$, $N_3$, and $N_4$ in the embodiments of this application are also function explanations. Whether a corresponding resource unit is used to send a symbol needs to be determined based on a specific implementation. Actually, in this embodiment of this application, the $P_2$ second symbols are not sent and are only an intermediate variable used to determine the $P_3$ third symbols, and symbols (for example, the $P_1$ first symbols and the $P_3$ third symbols) corresponding to other resource units need to be sent.

S230: The transmit end device determines the $P_3$ third symbols based on the $P_1$ first symbols and the $P_2$ second symbols, where $P_3=M \times N_3$, $N_3$ is a quantity of resource units used to carry the $P_3$ third symbols, and $N_3$ is less than or equal to $N_2$.

For example, the transmit end device performs linear transformation on the $P_2$ second symbols based on but not limited to the $P_1$ first symbols and the $P_2$ second symbols, to obtain the $P_3$ third symbols.

For ease of description, the $P_1$ first symbols are denoted as a first symbol group, the $P_2$ second symbols are denoted as a second symbol group, and all symbols obtained after linear transformation is performed on the second symbol group are denoted as a third symbol group.

For example, corresponding to the foregoing first idea, in non-coherent transmission, due to a characteristic that linear transformation is performed on a matrix corresponding to a constellation point without changing data carried on the constellation point, linear transformation is performed on the second symbol group based on the first symbol group and the second symbol group, to obtain the third symbol group, so that at least one symbol in the third symbol group is equal to at least one symbol in the first symbol group, that is, the first symbol group and the third symbol group have an overlapping symbol. In this way, the overlapping symbol of the two symbol groups may be transmitted on a same resource, so that resources that originally carry symbols whose quantity is equal to a quantity of overlapping symbols is saved, wasted degrees of freedom in non-coherent transmission is reduced, and resource utilization is improved.

In this implementation, if $N_3=N_2$, $P_3=P_2$, the $P_3$ third symbols are all symbols obtained after linear transformation is performed on the $P_2$ second symbols, that is, the $P_3$ third symbols are all symbols in the third symbol group. If $N_3$ is less than $N_2$, $P_3$ is less than $P_2$, and the $P_3$ third symbols are symbols in the third symbol group other than the symbol overlapping with the first symbol group, that is, the $P_3$ third symbols are a portion of the symbols in the third symbol group.

For example, corresponding to the foregoing second idea, in non-coherent transmission, due to a characteristic that linear transformation is performed on a matrix corresponding to a constellation point without changing data carried on the constellation point, in S210, linear transformation is performed on a matrix including symbols corresponding to the first constellation point to obtain the first symbol group; in S230, linear transformation is performed on a matrix including the second symbols based on but not limited to the first symbol group and the second symbol group to obtain the third symbol group; data is carried in a differential manner between two matrices that are used to perform linear transformation on the matrices including the symbols. In a same resource condition, more data may be carried, thereby improving resource utilization.

In this implementation, if $N_3=N_2$, $P_3=P_2$, and the $P_3$ third symbols are all symbols in the third symbol group.

S240: The transmit end device sends the $P_1$ first symbols and the $P_3$ third symbols. Correspondingly, the receive end device receives the $P_1$ first symbols and the $P_3$ third symbols.

S250: The receive end device determines the first to-be-modulated bit and the second to-be-modulated bit based on the $P_1$ first symbols and the $P_3$ third symbols.

In this step, based on the foregoing two ideas, manners of processing the $P_1$ first symbols and the $P_3$ third symbols by the receive end device are different. For specific descriptions, refer to the following descriptions.

Therefore, according to the communication method provided in this embodiment of this application, the first to-be-modulated bit and the second to-be-modulated bit are modulated by using constellation points corresponding to a plurality of resource units, to obtain the $P_1$ first symbols carrying the first to-be-modulated bit and the $P_2$ second symbols carrying the second to-be-modulated bit. The $P_1$ first symbols are associated with the $P_2$ second symbols, to determine the $P_3$ third symbols that are actually sent and related to the second to-be-modulated bit. The $P_1$ first symbols and the $P_3$ third symbols are sent, so that wasted degrees of freedom in non-coherent transmission can be reduced, to improve resource utilization.

As described above, this embodiment of this application provides two possible ideas to implement non-coherent transmission. The following separately describes this embodiment of this application in detail based on the foregoing two ideas.

Manner 1 (Corresponding to a First Idea)

In S210, the transmit end device determines the $P_1$ first symbols based on the first to-be-modulated bit in the plurality of to-be-modulated bits, where $P_1=M \times N_1$, $N_1$ is the quantity of resource units used to carry the $P_1$ first symbols, M is a positive integer, and $N_1$ is an integer greater than 1.

The $P_1$ first symbols may be symbols corresponding to the first constellation point determined based on the first to-be-modulated bit, or may be symbols obtained after linear transformation is performed on symbols corresponding to the first constellation point. If the first to-be-modulated bit is the $1^{st}$ to-be-modulated bit in the plurality of to-be-modulated bits, linear transformation does not need to be performed on modulated symbols, and only the $P_1$ first symbols of the first constellation point corresponding to the first to-be-modulated bit need to be determined; if the first to-be-modulated bit is not the $1^{st}$ to-be-modulated bit in the plurality of to-be-modulated bits, linear transformation needs to be performed on the symbols corresponding to the first constellation point, to obtain the $P_1$ first symbols. For a manner of performing linear transformation on the symbols corresponding to the first constellation point, refer to a process of performing linear transformation on the $P_2$ second symbols corresponding to the second constellation point in S230. Details are not described herein again.

In S220, the transmit end device determines the second constellation point based on the second to-be-modulated bit in the plurality of to-be-modulated bits, where the second constellation point corresponds to the $P_2$ second symbols, $P_2=M \times N_2$, and $N_2$ is an integer greater than 1.

In S230, optionally, the determining $P_3$ third symbols based on the $P_1$ first symbols and the $P_2$ second symbols includes:

performing linear transformation on the $P_2$ second symbols based on $P_4$ symbols in the $P_1$ first symbols and $P_4$ second symbols in the $P_2$ second symbols, to determine the $P_3$ third symbols, where $P_4=M \times N_4$, $N_4$ is a quantity of resource units used to carry the $P_4$ symbols, and $N_4$ is an integer greater than or equal to 1 and less than or equal to M.

The $P_4$ symbols may be arbitrary symbols that are in the $P_1$ first symbols and that form a matrix with M rows and $N_4$ columns, and the $P_4$ second symbols may be arbitrary symbols that are in the $P_2$ second symbols and that form a matrix with M rows and $N_4$ columns. This is not limited in this application.

It is assumed that a matrix including the first symbol group (namely, $P_1$ first symbols) is $X_1$, the matrix $X_1$ is a matrix with M rows and $N_1$ columns, a matrix including the second symbol group (namely, $P_2$ second symbols) is $X_2$, the matrix $X_2$ is a matrix with M rows and $N_2$ columns, a matrix including the third symbol group is $\overline{X}_2$, the matrix $\overline{X}_2$ is a matrix with M rows and $N_2$ columns, a matrix including the $P_4$ symbols is $A_1$, the matrix $A_1$ is a matrix with M rows and $N_4$ columns, a matrix including the $P_4$ second symbols is $B_2$, and the matrix $B_2$ is a matrix with M rows and $N_4$ columns. For ease of description, a matrix used to perform linear transformation on $X_2$ is denoted as $T_2$, where $T_2$ is generated by $A_1$ and $B_2$, and $T_2$ is a square matrix with M rows and M columns. In this case, a formula for obtaining the matrix $\overline{X}_2$ by performing linear transformation on the matrix N may be represented as $\overline{X}_2 = T_2 X_2$.

For example, if $N_4=M$, that is, a quantity of resource units used to carry the $P_4$ symbols and a quantity of resource units used to carry the $P_4$ second symbols are both M, and the matrix $A_1$ including the $P_4$ symbols and the matrix $B_2$ including the $P_4$ second symbols are each a square matrix with M rows and M columns, a formula for obtaining the matrix $\overline{X}_2$ by performing linear transformation on the matrix N may be represented as $\overline{X}_2 = T_2 X_2 = A_1 B_2 X_2$, where $T_2 = A_1 B_2$.

For example, if $N_4$ is less than M, a formula for obtaining the matrix $\overline{X}_2$ by performing linear transformation on the matrix $X_2$ may be represented as $\overline{X}_2 = T_2 X_2 = A_1 (B_2^H B_2)^{-1} B_2^H X_2$, where $T_2 = A_1 (B_2^H B_2)^{-1} B_2^H$, $B_2^H$ represents a conjugate matrix of the matrix $B_2$ and $(B_2^H B_2)^{-1}$ represents an inverse matrix of the matrix $B_2^H B_2$.

If $N_2=N_3$, $P_2=P_3$, and the $P_3$ third symbols are all symbols in the third symbol group. If $N_3$ is less than $N_2$, the $P_3$ third symbols are a portion of the symbols in the third symbol group.

A result of performing linear transformation on $X_2$ by using the square matrix $T_2$ is as follows: For $X_2$, new symbols $\overline{X}_2$ are generated through linear transformation. Based on the characteristic of non-coherent transmission, transmitted data is not changed after linear transformation is performed on any symbol in non-coherent transmission. Therefore, same data is actually carried on $X_2$ and $\overline{X}_2$, and the transmitted data is not affected. However, because $X_2$ becomes $\overline{X}_2$, the third symbol group corresponding to $\overline{X}_2$ has the $P_4$ symbols in the first symbol group, that is, the third symbol group and the first symbol group have $P_4$ overlapping symbols. Therefore, in a resource mapping process, only the $P_4$ symbols need to be mapped to $N_4$ resource units, the $N_4$ resource units carry the symbols in both the two symbol groups, symbols other than the $P_4$ symbols in the first symbol group are mapped to $N_1-N_4$ resource units, and symbols other than the $P_4$ symbols in the third symbol group are mapped to $N_2-N_4$ resource units. Alternatively, the first symbol group is mapped to the $N_1$ resource units, the $P_4$ symbols in the third symbol group are symbols that have been mapped to $N_4$ resource units in the $N_1$ resource units, and symbols other than the $P_4$ symbols in the third symbol group are mapped to $N_2-N_4$ resource units. In this way, for transmission of symbols in the first symbol group and the third symbol group, $N_1+N_2$ resource units are used in a conventional technology, but $N_1+N_2-N_4$ resource units are used in this embodiment of this application. That is, the $N_4$ resource units are reused. Therefore, compared with the conventional technology, resources that originally carry symbols whose quantity is equal to a quantity of overlapping symbols are saved, thereby improving resource utilization.

Based on the foregoing analysis, from a perspective of a resource carrying a symbol, a relationship between the $P_1$ first symbols and the $P_3$ third symbols in this embodiment of this application is described in detail by using two cases.

Case 1: $N_2=N_3$, and $P_3$ third symbols are all symbols in the third symbol group.

In this case, the $P_1$ first symbols are carried on the $N_1$ resource units, the $P_3$ third symbols are carried on the $N_3$ resource units (or $N_2$ resource units), the $N_1$ resource units and the $N_3$ resource units include the $N_4$ overlapping resource units, the $P_1$ first symbols and the $P_3$ third symbols include the $P_4$ overlapping symbols, the $P_4$ symbols are carried on the $N_4$ resource units, and the $P_3$ third symbols have a linear relationship with the $P_2$ second symbols, where $P_4=M \times N_4$, and $N_4$ is an integer greater than or equal to 1 and less than or equal to M.

The overlapping $P_4$ symbols belong to the $P_1$ first symbols, and also belong to the $P_3$ third symbols.

For ease of description, in this case, the $N_1$ resource units are denoted as a first resource, and the $N_2$ resource units or the $N_3$ resource units are denoted as a second resource.

The first resource is a modulation resource block used to carry the first symbol group ($P_1$ first symbols), and the second resource is another modulation resource block used to carry the third symbol group ($P_3$ third symbols). Resource units in each modulation resource block may be consecutive, or may be inconsecutive. This is not limited herein. The quantity $N_1$ of resource units included in the first resource and the quantity $N_3$ of resource units included in the second resource may be the same or different, provided that the first resource and the second resource include an overlapping resource. This is not limited herein.

FIG. 4 is a schematic diagram of a relationship among a plurality of modulation resource blocks according to an embodiment of this application. The first resource and the second resource may be any two adjacent modulation resource blocks in the plurality of modulation resource blocks. For example, a resource used to transmit a to-be-transmitted bit stream includes 13 resource units, which are respectively a resource unit #0, a resource unit #1, . . . , and a resource unit #12, and form six modulation resource blocks. Six to-be-modulated bits are generated based on the to-be-transmitted bit stream, and a symbol generated based on each to-be-modulated bit is transmitted on each modulation resource block. Assuming M=1 and $N_4$=M=1, two adjacent modulation resource blocks have one overlapping resource unit, and a symbol shared by two symbol groups is transmitted on the overlapping resource unit. That is, the resource unit is reused between the two modulation resource blocks. It can be learned that although the 13 resource units are used, symbols on 13+5=18 resource units in the conventional technology are actually carried.

In S240, the transmit end device sends the $P_1$ first symbols on the first resource by using M antenna ports, and sends symbols other than the $P_4$ symbols in the $P_3$ third symbols on $N_3-N_4$ resource units in the second resource. The $P_4$ symbols sent on the $N_4$ resource units in the first resource and the symbols sent on the $N_3-N_4$ resource units are combined to send the $P_3$ third symbols. Correspondingly, by using the M antenna ports, the receive end device receives the $P_1$ first symbols on the first resource, and receives the $P_3$ third symbols on the second resource.

In S250, the receive end device determines the first to-be-modulated bit and the second to-be-modulated bit based on the $P_1$ first symbols and the $P_3$ third symbols.

For example, the transmit end device or the receive end device may know, based on a predefinition or signaling, an overlapping resource of two adjacent modulation resource blocks. In this way, the transmit end device may determine a plurality of modulation resource blocks based on resource units used to transmit a to-be-transmitted bit stream, and send symbols on each modulation resource block. The receive end device may determine the plurality of modulation resource blocks based on the resource units used to transmit the to-be-transmitted bit stream, and receive the symbols on each modulation resource block. FIG. 4 is still used as an example. It is defined in a protocol that two adjacent modulation resource blocks have one overlapping resource unit. Alternatively, if the transmit end device or the receive end device is a terminal device, a network device may send signaling to the terminal device, to indicate that two adjacent modulation resource blocks may have one overlapping resource unit.

Herein, for a process in which the receive end device receives the $P_1$ first symbols, determines the first to-be-modulated bit, receives the $P_3$ third symbols, and determines the second to-be-modulated bit, refer to the foregoing process in which the receive end device receives the P symbols and determines the corresponding to-be-modulated bit. Details are not described herein again.

If the first to-be-modulated bit or the second to-be-modulated bit is a bit obtained after the transmit end device performs channel coding and/or scrambling processing on a bit of the to-be-transmitted bit stream, the receive end device may further decode and/or descramble the first to-be-modulated bit or the second to-be-modulated bit, to obtain a bit on which no channel coding and/or scrambling are/is performed.

Case 2: $N_3=N_2-N_4$, and $P_3$ third symbols are a portion of the symbols in the third symbol group.

In this case, the $P_1$ first symbols are carried on the $N_1$ resource units, the $N_1$ resource units include the $N_4$ resource units used to carry the $P_4$ symbols, the $P_3$ third symbols are carried on the $N_3$ resource units, and $P_2$ third symbols including the $P_4$ symbols and the $P_3$ third symbols have a linear relationship with the $P_2$ second symbols, where $P_4=M \times N_4$, and $N_4$ is an integer greater than or equal to 1 and less than or equal to M.

The $P_4$ symbols belong to the $P_1$ first symbols, and also belong to the $P_3$ third symbols. The $P_2$ third symbols including the $P_4$ symbols and the $P_3$ third symbols are all symbols in the third symbol group. The $P_2$ third symbols have the linear relationship with the $P_2$ second symbols. This indicates that there is a square matrix. The $P_2$ third symbols may be obtained by performing linear transformation on the $P_2$ second symbols by using the square matrix. For example, there is a square matrix $T_2$ enabling $\overline{X}_2=T_2 X_2$.

For ease of description, in this case, the $N_1$ resource units are denoted as a first resource, the $N_3$ resource units are denoted as a third resource, and the $N_2$ resource units including the $N_4$ resource units and the $N_3$ resource units are denoted as a second resource.

The first resource is a modulation resource block used to carry the $P_1$ first symbols, and includes the $N_1$ resource units. The $P_4$ symbols are overlapping symbols of the $P_1$ first symbols and the $P_2$ third symbols. The second resource is another modulation resource block used to carry the $P_2$ third symbols, and includes the $N_2$ resource units. It may be understood that the $N_4$ resource units are resources shared by the first resource and the second resource, and are used to carry the $P_4$ overlapping symbols.

Continue to refer to FIG. 4. For example, the first resource is a resource block #1, and the second resource is a resource block #2. One resource unit shared by the first resource and the second resource is a resource unit #4, and the third resource includes a resource unit #5 and a resource unit #6.

Optionally, the first resource is adjacent to the third resource in time domain or frequency domain. Continue to refer to FIG. 4. If the x-axis represents time domain, it may be understood that the first resource is adjacent to the third resource in time domain; if the x-axis represents frequency domain, it may be understood that the first resource is adjacent to the third resource in frequency domain.

Certainly, the first resource and the third resource may alternatively be spaced by one or more resource units. This is not limited in the embodiments of this application.

In S240, the transmit end device sends the $P_1$ first symbols on the first resource by using M antenna ports, and sends the $P_3$ third symbols on the third resource. The $P_4$ symbols sent on the $N_4$ resource units and the symbols sent on the third resource are combined to send the $P_2$ third symbols.

Correspondingly, by using the M antenna ports, the receive end device may receive the $P_1$ first symbols on the first resource, and receive the $P_2$ third symbols including the $P_3$ third symbols and the $P_4$ symbols on the second resource.

In S250, the receive end device determines the first to-be-modulated bit and the second to-be-modulated bit based on the $P_1$ first symbols and the $P_2$ third symbols.

For specific descriptions of S240 and S250, refer to the related descriptions in the case 1. Details are not described again.

Manner 2 (Corresponding to a Second Idea)

In this manner, $N_2=N_3$, that is, $P_2=P_3$, and the $P_3$ third symbols are all symbols in the third symbol group. Linear transformation may be performed on a matrix including symbols corresponding to a constellation point, and data is carried in a differential manner between matrices used to perform linear transformation, so that three to-be-modulated bits may be transmitted on the two modulation resource blocks. In this way, in a same resource condition, more data can be carried, thereby improving resource utilization. For ease of description, the $P_3$ third symbols are replaced with the $P_2$ third symbols in the following descriptions.

In S201, the transmit end device determines the plurality of to-be-modulated bits based on the to-be-transmitted bit stream.

In this step, the to-be-transmitted bit stream may be divided into a first to-be-transmitted bit stream and a second to-be-transmitted bit stream. For example, the first to-be-transmitted bit stream may be understood as data transmitted through non-coherent transmission. The second to-be-transmitted bit stream may be understood as data transmitted on different modulation resource blocks in a differential manner. For example, one of at least one to-be-modulated bit determined based on the second to-be-transmitted bit stream may be transmitted on two modulation resource blocks. In this case, a plurality of to-be-modulated bits are determined based on the first to-be-transmitted bit stream and the second to-be-transmitted bit stream. For the two modulation resource blocks, one to-be-modulated bit determined based on the first to-be-transmitted bit stream may be transmitted on one modulation resource block, and one to-be-modulated bit determined based on the second to-be-transmitted bit stream may be transmitted on the two modulation resource blocks, so that three to-be-modulated bits are transmitted on the two modulation resource blocks.

In the two to-be-transmitted bit streams, a plurality of to-be-modulated bits may be determined based on the first to-be-transmitted bit stream, and the plurality of to-be-modulated bits include the first to-be-modulated bit and the second to-be-modulated bit. At least one to-be-modulated bit may be determined based on the second to-be-transmitted bit stream, and the at least one to-be-modulated bit includes the third to-be-modulated bit. For ease of description, the first to-be-modulated bit, the second to-be-modulated bit, and the third to-be-modulated bit are used as examples to describe a relationship between each to-be-transmitted bit stream and a to-be-modulated bit.

Optionally, the first to-be-modulated bit and the second to-be-modulated bit are determined based on at least one bit of the first to-be-transmitted bit stream, and the third to-be-modulated bit is determined based on at least one bit of the second to-be-transmitted bit stream.

The at least one bit of the first to-be-transmitted bit stream includes all or a portion of bits of the first to-be-transmitted bit stream. If only the first to-be-modulated bit and the second to-be-modulated bit are determined based on the first to-be-transmitted bit stream, the at least one bit is all bits of the first to-be-transmitted bit stream. If a plurality of to-be-modulated bits including the first to-be-modulated bit and the second to-be-modulated bit are determined based on the first to-be-transmitted bit stream, the at least one bit is a portion of the bits of the first to-be-transmitted bit stream. Similarly, at least one bit of the second to-be-transmitted bit stream includes all or a portion of bits of the second to-be-transmitted bit stream. If only the third to-be-modulated bit is determined based on the second to-be-transmitted bit stream, the at least one bit is all bits of the second to-be-transmitted bit stream. If a plurality of to-be-modulated bits including the third to-be-modulated bit are determined based on the second to-be-transmitted bit stream, the at least one bit is a portion of the bits of the second to-be-transmitted bit stream.

For example, the to-be-modulated bit may be obtained in the following manner. The first to-be-modulated bit and the second to-be-modulated bit may be any two to-be-modulated bits determined based on the first to-be-transmitted bit stream, and the third to-be-modulated bit may be any to-be-modulated bit determined based on the second to-be-transmitted bit stream.

In a possible implementation, the first to-be-transmitted bit stream may be divided into a plurality of groups, each group includes at least one bit, and a bit obtained by performing channel coding and/or scrambling processing on the group of bits is used as one to-be-modulated bit. The second to-be-transmitted bit stream may be divided into at least one group, each group includes at least one bit, and a bit obtained by performing channel coding and/or scrambling processing on the group of bits is used as one to-be-modulated bit.

In another possible implementation, a bit stream obtained by performing channel coding and/or scrambling processing on the first to-be-transmitted bit stream may be divided into a plurality of groups, each group includes at least one bit, and one group of bits are used as one to-be-modulated bit. A bit stream obtained by performing channel coding and/or scrambling processing on the second to-be-transmitted bit stream may be divided into at least one group, each group includes at least one bit, and one group of bits are used as one to-be-modulated bit.

Optionally, the first to-be-modulated bit and the second to-be-modulated bit belong to the first to-be-transmitted bit stream, and the third to-be-modulated bit belongs to the second to-be-transmitted bit stream.

In other words, the first to-be-modulated bit, the second to-be-modulated bit, and the third to-be-modulated bit are all bits that have not been processed at a physical layer.

Optionally, the first to-be-modulated bit and the second to-be-modulated bit are determined based on the at least one bit of the first to-be-transmitted bit stream, and the third to-be-modulated bit belongs to the second to-be-transmitted bit stream.

For specific descriptions of the at least one bit of the first to-be-transmitted bit stream and the obtained first to-be-modulated bit and second to-be-modulated bit, refer to the foregoing related descriptions. Details are not described again. The third to-be-modulated bit is a bit that has not been processed at the physical layer.

Optionally, the first to-be-modulated bit and the second to-be-modulated bit belong to the first to-be-transmitted bit stream, and the third to-be-modulated bit is determined based on the at least one bit of the second to-be-transmitted bit stream.

The first to-be-modulated bit and the second to-be-modulated bit are bits that have not been processed at the physical layer. For specific descriptions about the at least one bit of the second to-be-transmitted bit stream and the third to-be-modulated bit, refer to the foregoing related descriptions. Details are not described again.

The first to-be-transmitted bit stream is data transmitted through non-coherent transmission, and the second to-be-transmitted bit stream is data transmitted between different modulation resource blocks in a differential manner. For the second to-be-transmitted bit stream, channel values of the two modulation resource blocks inevitably have a difference, a channel significantly changes, and data transmission performance is poor. For the first to-be-transmitted bit stream, channel values of a same modulation resource block may be considered to be approximate. Therefore, a channel slightly changes, and data transmission performance is good. Based on this, in a process of determining the to-be-modulated bit, different transmission parameters (for example, code rates, modulation schemes, and spectral efficiency) may be configured for the first to-be-transmitted bit stream and the second to-be-transmitted bit stream, to match with transmission performance.

Optionally, a code rate of the first to-be-transmitted bit stream is different from a code rate of the second to-be-transmitted bit stream;
 a modulation scheme of the first to-be-transmitted bit stream is different from a modulation scheme of the second to-be-transmitted bit stream; and/or
 spectral efficiency of the first to-be-transmitted bit stream is different from spectral efficiency of the second to-be-transmitted bit stream.

The code rate represents a code rate at which channel coding is performed on a bit, and represents a ratio of the bit before encoding to the bit after encoding. In the modulation scheme, the to-be-modulated bit may be modulated to obtain a modulated symbol. A unit of the spectral efficiency is bit/second/hertz (bit/s/Hz), and represents a quantity of bits that can be carried on one resource unit. A quantity of bits that can be carried on a modulation resource block may be determined by using a product of the spectral efficiency and a quantity of resource units included in the modulation resource block.

For example, the code rate of the first to-be-transmitted bit stream is greater than the code rate of the second to-be-transmitted bit stream. For example, the code rate of the first to-be-transmitted bit stream may be 0.2 greater than the code rate of the second to-be-transmitted bit stream.

For example, the spectral efficiency of the first to-be-transmitted bit stream is greater than the spectral efficiency of the second to-be-transmitted bit stream. For example, the spectral efficiency of the first to-be-transmitted bit stream may be 1.5 times the spectral efficiency of the second to-be-transmitted bit stream.

For example, the modulation scheme for the first to-be-transmitted bit stream may be a modulation scheme in non-coherent transmission, that is, the to-be-modulated bit is modulated by using a constellation point corresponding to a plurality of resource units; for the second to-be-transmitted bit stream, a modulation scheme such as amplitude shift keying (ASK), frequency shift keying (FSK), and phase shift keying (PSK) may be used.

In the PSK, a peak to average power ratio (PAPR) in a data transmission process is effectively reduced without changing an amplitude of a symbol. Therefore, optionally, the PSK, for example, quadrature phase shift keying (QPSK) in the PSK, may be used to modulate the second to-be-transmitted bit stream.

The transmit end device may determine transmission parameters of the first to-be-transmitted bit stream and the second to-be-transmitted bit stream in the following manners.

In a possible implementation, the network device may separately configure transmission parameters of the first to-be-transmitted bit stream and the second to-be-transmitted bit stream by using signaling. If the transmit end device is the terminal device, the transmission parameters of the first to-be-transmitted bit stream and the second to-be-transmitted bit stream may be obtained by using the signaling sent by the network device.

In another possible implementation, the transmit end device may determine a transmission parameter of one of the first to-be-transmitted bit stream and the second to-be-transmitted bit stream based on a predefined difference between parameters of the first to-be-transmitted bit stream and the second to-be-transmitted bit stream and a transmission parameter of the other to-be-transmitted bit stream. The transmission parameter of the to-be-transmitted bit stream may be predefined, or may be configured by the network device.

For example, the difference between parameters of the first to-be-transmitted bit stream and the second to-be-transmitted bit stream may be: The code rate of the first to-be-transmitted bit stream may be 0.2 greater than the code rate of the second to-be-transmitted bit stream, and the spectral efficiency of the first to-be-transmitted bit stream may be 1.5 times the spectral efficiency of the second to-be-transmitted bit stream.

In another possible implementation, a transmission parameter of one to-be-transmitted bit stream may be predefined, and a transmission parameter of the other to-be-transmitted bit stream may be configured by the network device or predefined.

For example, because the second to-be-transmitted bit stream is related to a channel change degree, the transmission parameter of the second to-be-transmitted bit stream may be predefined. For example, the modulation scheme is QPSK, and/or the code rate is 1/3, and/or the spectral efficiency is 0.1 bit/s/Hz.

In S210, optionally, the determining $P_1$ first symbols based on a first to-be-modulated bit includes:
   determining a first constellation point based on the first to-be-modulated bit, where the first constellation point corresponds to $P_1$ fifth symbols; and
   performing linear transformation on the $P_1$ fifth symbols by using a matrix $T_1$, to determine the $P_1$ first symbols.

For example, it is assumed that a matrix including the $P_1$ fifth symbols corresponding to the first constellation point is $X_1$, the matrix $X_1$ is a matrix with M rows and $N_1$ columns, a matrix including the $P_1$ first symbols is $\overline{X}_1$, the matrix $\overline{X}_1$ is a matrix with M rows and $N_1$ columns, and $T_1$ is a square matrix with M rows and M columns. In this case, a relationship among $X_1$, $T_1$, and $\overline{X}_1$ may be represented as $\overline{X}_1 = T_1 X_1$ or $\overline{X}_1 = X_1 T_1$.

In S220, the transmit end device determines a second constellation point based on the second to-be-modulated bit in the plurality of to-be-modulated bits, where the second constellation point corresponds to $P_2$ second symbols, $P_2 = M \times N_2$, and $N_2$ is an integer greater than 1.

$N_2$ may be understood as a quantity of resource units used to carry the $P_2$ second symbols.

In S230, optionally, the determining $P_3$ third symbols (namely, $P_2$ third symbols) based on the $P_1$ first symbols and the $P_2$ second symbols includes:
   performing linear transformation on the $P_2$ second symbols by using a matrix $T_2$, to determine the $P_3$ third symbols (namely, $P_2$ third symbols), where the matrix $T_2$ and the matrix $T_1$ satisfy any one of the following: $C_1 = T_1 T_2^{-1}$, $C_1 = T_1^{-1} T_2$, $C_1 = T_2 T_1^{-1}$, or $C_1 = T_2^{-1} T_1$, the matrix $C_1$ is a matrix with M rows and M columns, and a symbol including the matrix $C_1$ is determined based on the third to-be-modulated bit.

For example, it is assumed that a matrix including the $P_2$ second symbols is $X_2$, the matrix $X_2$ is a matrix with M rows and $N_2$ columns, a matrix including the $P_3$ third symbols is $\overline{X}_2$, the matrix $\overline{X}_2$ is a matrix with M rows and $N_2$ columns, and the matrix $T_2$ is a matrix with M rows and M columns. In this case, a relationship among $X_2$, $\overline{X}_2$, and $T_2$ may be represented as $\overline{X}_2 = T_2 X_2$ or $\overline{X}_2 = X_2 T_2$.

The following describes a relationship between the to-be-modulated bits by using the foregoing $\overline{X}_1 = T_1 X_1$, $\overline{X}_2 = T_2 X_2$, and $C_1 = T_1^{-1} T_2$ as an example, from a perspective of determining the plurality of to-be-modulated bits based on the to-be-transmitted bit stream. It should be understood that the first to-be-modulated bit and the second to-be-modulated bit are any two of the plurality of to-be-modulated bits determined based on the first to-be-transmitted bit stream, and the third to-be-modulated bit is any one of the at least one to-be-modulated bit determined based on the second to-be-transmitted bit stream.

It is assumed that m to-be-modulated bits may be determined based on the first to-be-transmitted bit stream, a matrix including symbols corresponding to a constellation point determined based on an $i^{th}$ to-be-modulated bit in the m to-be-modulated bits is denoted as $X_i$, and a matrix used to perform linear transformation on the matrix $X_i$ is denoted as $T_i$, where i ranges from 1 to m; n to-be-modulated bits may be determined based on the second to-be-transmitted bit stream, and a matrix including symbols corresponding to a constellation point determined based on an $j^{th}$ to-be-modulated bit in the n to-be-modulated bits is denoted as $C_j$, where j ranges from 1 to n, and n is less than m. A difference between every two of n+1 to-be-modulated bits in the m to-be-modulated bits may be one of the n to-be-modulated bits. For example, $T_1 = I$, $T_2 = T_1 C_1$, $T_3 = T_2 C_2 = T_1 C_1 C_2$, ..., and $$T_{j+1} = T_j C_j = T_j \prod_{j=1}^{n} C_j$$

are satisfied, where I is a unit matrix. In this case, $\overline{X}_1 = T_1 X_1 = X_1$ and $\overline{X}_{j+i} = T_{j+1} X_{j+1}$.

Optionally, m=n+1. In this case, a difference between any two of the m to-be-modulated bits may be one of the n to-be-modulated bits.

When m≠n+1, for to-be-modulated bits other than the n+1 to-be-modulated bits in the m to-be-modulated bits, symbols corresponding to a constellation point may be determined based on each of the m−(n+1) to-be-modulated bits. Linear transformation does not need to be performed on the determined symbols.

It should be noted that the matrix $X_1$ corresponding to the first to-be-modulated bit is not necessarily $X_1$ in $X_{j+1}$, the matrix $X_2$ corresponding to the second to-be-modulated bit is not necessarily $X_2$ in $X_{j+1}$, and the matrix $C_1$ corresponding to the third to-be-modulated bit is not necessarily $C_1$ in $C_j$. The matrix $X_1$ corresponding to the first to-be-modulated bit and the matrix $X_2$ corresponding to the second to-be-modulated bit may be any two matrices in $X_{j+1}$, and the matrix $C_1$ corresponding to the third to-be-modulated bit may be any one matrix in $C_j$.

It should be noted that if the matrix $X_1$ corresponding to the first to-be-modulated bit is $X_1$ in $X_{j+1}$, $T_1$ is actually a unit matrix. Therefore, in S210, $T_1$ does not need to be used to perform linear transformation on the matrix $X_1$, and the matrix including the symbols corresponding to the first constellation point is directly considered as $\overline{X}_1$. Herein, $\overline{X}_1 = T_1 X_1 = X_1$ or $\overline{X}_1 = X_1 T_1 = X_1$.

It can be learned from S210 to S230 that the matrices $T_1$ and $T_2$ that are used to perform linear transformation on the matrices including symbols corresponding to two constellation points are associated with the matrix $C_1$ of the symbols determined based on the third to-be-modulated bit, so that the $P_1$ first symbols and the $P_2$ third symbols carry the first to-be-modulated bit and the second to-be-modulated bit respectively, and the $P_1$ first symbols and the $P_2$ third symbols further jointly carry the third to-be-modulated bit.

The $P_1$ first symbols and the $P_2$ third symbols are respectively carried by using two resources. For ease of description, the $N_1$ resource units used to carry the $P_1$ first symbols are denoted as a fourth resource, and the $N_2$ resource units used to carry the $P_2$ third symbols are denoted as a fifth resource.

The fourth resource is a modulation resource block, and the fifth resource is another modulation resource block. Resource units in each modulation resource block may be consecutive or inconsecutive. This is not limited herein. The quantity $N_1$ of resource units included in the fourth resource and the quantity $N_2$ of resource units included in the fifth resource may be the same or different, provided that the fourth resource and the fifth resource include an overlapping resource. This is not limited herein.

Because the fourth resource and the fifth resource may jointly carry the third to-be-modulated bit or the symbols determined based on the third to-be-modulated bit, in consideration of a channel change degree, to improve poor data transmission performance resulted from a channel change, and to ensure transmission performance of non-coherent transmission as much as possible, optionally, the fourth resource is adjacent to the fifth resource in time domain or frequency domain. In this way, a channel change of the two resources is small, and data transmission performance in non-coherent transmission is improved.

FIG. 5 is a schematic diagram of a relationship among a plurality of modulation resource blocks according to an embodiment of this application. For example, the fourth resource and the fifth resource may be any two adjacent modulation resource blocks in a plurality of modulation resource blocks. For example, the fourth resource is a resource block #0, and the fifth resource is a resource block #1. If the x-axis represents time domain, it may be understood that the first resource is adjacent to the third resource in time domain; if the x-axis represents frequency domain, it may be understood that the first resource is adjacent to the third resource in frequency domain.

Certainly, the fourth resource and the fifth resource may be any two modulation resource blocks that are not adjacent to each other in the plurality of modulation resource blocks. For example, the fourth resource is the resource block #0, and the fifth resource is a resource block #2. This is not limited in this embodiment of this application.

In S240, the determining the first to-be-modulated bit and the second to-be-modulated bit based on the $P_1$ first symbols and the $P_3$ third symbols includes:
  determining the first to-be-modulated bit, the second to-be-modulated bit, and the third to-be-modulated bit based on the $P_1$ first symbols and the $P_3$ third symbols (namely, $P_2$ third symbols).

In addition, if the first to-be-modulated bit, the second to-be-modulated bit, or the third to-be-modulated bit is a bit obtained after the transmit end device performs channel coding and/or scrambling processing on a bit of the to-be-transmitted bit stream, the receive end device may further decode and/or descramble any to-be-modulated bit, to obtain a bit on which no channel coding and/or scrambling are/is performed.

For example, four relationships between $C_1$ and $T_1$ and $T_2$ are used as examples below to describe a process in which the receive end device determines the three to-be-modulated bits.

In a first possible implementation, $\overline{X}_1 = T_1 X_1$ and $\overline{X}_2 = T_2 X_2$. Symbols that are corresponding to the $P_1$ first symbols and that are received by the receive end device may be $Y_1 = H_1 \overline{X}_1 + W_1 = H_1 T_1 X_1 + W_1$, where the matrix $H_1$ is an S×M-dimensional matrix and represents CSI of channels used to transmit the $P_1$ first symbols, and the matrix $W_1$ is an S×$N_1$-dimensional matrix and represents noise in the channels; symbols corresponding to the $P_2$ third symbols may be $Y_2 = H_2 \overline{X}_2 + W_2 = H_2 T_2 X_2 + W_2$, where the matrix $H_2$ is an S×M-dimensional matrix and represents CSI of channels used to transmit the $P_2$ third symbols, and the matrix $W_2$ is an S*$N_2$-dimensional matrix and represents noise in the channels. In this implementation, the relationships between $C_1$ and $T_1$ and $T_2$ may be represented as $C_1 = T_1^{-1} T_2$ and $C_1 = T_2^{-1} T_1$.

In a second possible implementation, signals received by the receive end device may be represented as a transposition of the signals received by the receive end device in the first possible implementation. For example, $\overline{X}_1 = X_1 T_1$ and $\overline{X}_2 = X_2 T_2$. Symbols that are corresponding to the $P_1$ first symbols and that are received by the receive end device may be $Y_1 = \overline{X}_1 H_1 + W_1 = X_1 T_1 H_1 + W_1$, where the matrix $H_1$ is an $N_1$×S-dimensional matrix and represents CSI of channels used to transmit the $P_1$ first symbols, and the matrix $W_1$ is an M×S-dimensional matrix and represents noise in the channels; symbols corresponding to the $P_2$ third symbols may be $Y_2 = \overline{X}_2 H_2 + W_2 = X_2 T_2 H_2 + W_2$, where the matrix $H_2$ is an $N_2$×S-dimensional matrix and represents CSI of channels used to transmit the $P_2$ third symbols, and the matrix $W_2$ is an M×S-dimensional matrix and represents noise in the channels. For example, in this implementation, the relationships between $C_1$ and $T_1$ and $T_2$ may be represented as $C_1 = T_2 T_1^{-1}$ and $C_1 = T_1 T_2^{-1}$.

$$C_1 = T_1^{-1} T_2 \qquad 1.$$

In this case, $T_2 = T_1 C_1$, $Y_2 = H_2 \overline{X}_2 + W_2 = H_2 T_2 X_2 + W_2 = H_2 T_1 C_1 X_2 + W_2$, and $Y_1 = H_1 \overline{X}_1 + W_1 = H_1 T_1 X_1 + W_1$.

For $Y_1 = H_1 \overline{X}_1 + W_1 = H_1 T_1 X_1 + W_1$, the receive end device may know $Y_1$, and detect $X_1$ by using, for example, a manner in which the GLRT receiver detects the constellation point in the foregoing descriptions, to estimate the matrix $H_1 T_1$, which is denoted as $Y'_1 = H_1 T_1$; for $Y_2 = H_2 \overline{X}_2 + W_2 = H_2 T_1 C_1 X_2 + W_2$, the receive end device may know $Y_2$, and detect $X_2$ by using, for example, a manner in which the GLRT receiver detects the constellation point in the foregoing descriptions, to estimate the matrix $H_2 T_1 C_1$, which is denoted as $Y'_2 = H_2 T_1 C_1$. Assuming $H_1 = H_2$, the matrix $C_1 = (Y'_1)^{-1} Y'_2$ may be determined by using $(Y'_1)^{-1} Y'_2 = (H_1 T_1)^{-1} (H_2 T_1) C_1$, and symbols corresponding to the matrix $C_1$ may be demodulated by using a modulation scheme such as PSK, that is, the third to-be-modulated bit may be determined.

It should be noted that, regardless of whether $H_1$ is equal to $H_2$ in actual transmission, it is assumed that $H_1$ is equal to $H_2$ in a process of calculating $C_1$. Therefore, $C_1$ obtained in the foregoing manner may not be very accurate, and a bit error exists. It may be understood that a larger difference between $H_1$ and $H_2$ indicates a higher bit error rate of $C_1$. Explanations of the other three relationships are the same as those described herein. Details are not described herein again.

$$C_1 = T_2^{-1} T_1 \qquad 2.$$

In this case, $T_1 = T_2 C_1$, $Y_1 = H_1 \overline{X}_1 + W_1 = H_1 T_1 X_1 + W_1 = H_1 T_2 C_1 X_1 + W_1$, and $Y_2 = H_2 \overline{X}_2 + W_2 = H_2 T_2 X_2 + W_2$.

For $Y_1 = H_1 \overline{X}_1 + W_1 = H_1 T_2 C_1 X_1 + W_1$, the receive end device may know $Y_1$, and detect $X_1$ by using, for example, a manner in which the GLRT receiver detects the constellation point in the foregoing descriptions, to determine the matrix $H_1 T_2 C_1$, which is denoted as $Y'_1 = H_1 T_2 C_1$; for $Y_2 = H_2 \overline{X}_2 + W_2 = H_2 T_2 X_2 + W_2$, the receive end device may know $Y_2$, and detect $X_2$ by using, for example, a manner in which the GLRT receiver detects the constellation point in the foregoing descriptions, to estimate the matrix $H_2 T_2$, which is denoted as $Y'_2 = H_2 T_2$. Assuming $H_1 = H_2$, the matrix $C_1 = (Y'_2)^{-1} Y'_1$ may be determined by using $(Y'_2)^{-1} Y'_1 = (H_2 T_2)^{-1} (H_1 T_2) C_1$, and symbols corresponding to the matrix $C_1$ may be demodulated by using a modulation scheme such as PSK, that is, the third to-be-modulated bit may be determined.

$$C_1 = T_2 T_1^{-1} \qquad 3.$$

In this case, signals received by the receive end device may be represented as a transposition of the signals received by the receive end device in the case 1. In this case, $T_2 = C_1 T_1$, $Y_2 = \overline{X}_2 H_2 + W_2 = X_2 T_2 H_2 + W_2 = X_2 C_1 T_1 H_2 + W_2$, and $Y_1 = \overline{X}_1 H_1 + W_1 = X_1 T_1 H_1 + W_1$.

For $Y_1 = \overline{X}_1 H_1 + W_1 = X_1 T_1 H_1 + W_1$, the receive end device may know $Y_1$, and detect $X_1$ by using, for example, a manner in which the GLRT receiver detects the constellation point in the foregoing descriptions, to estimate the matrix $T_1 H_1$, which is denoted as $Y'_1 = T_1 H_1$; for $Y_2 = X_2 H_2 + W_2 = X_2 C_1 T_1 H_2 + W_2$, the receive end device may know $Y_2$, and detect $X_2$ by using, for example, a manner in which the GLRT receiver detects the constellation point in the foregoing descriptions, to determine the matrix $C_1T_1H_2$, which is denoted as $Y'_2=C_1T_1H_2$. Assuming $H_1=H_2$, $C_1=Y'_2(Y'_1)^{-1}$ may be determined by using $Y'_2(Y'_1)^{-1}=(C_1T_1H_2)(T_1H_2)^{-1}$, and symbols corresponding to the matrix $C_1$ may be demodulated by using a modulation scheme such as PSK, that is, the third to-be-modulated bit may be determined.

$$C_1 = T_1 T_2^{-1} \qquad 4.$$

In this case, signals received by the receive end device may be represented as a transposition of the signals received by the receive end device in the case 2. In this case, $T_1=C_1T_2$, $Y_1=\overline{X}_1H_1+W_1=X_1T_1H_1+W_1=X_1C_1T_2H_1+W_1$, and $Y_2=\overline{X}_2H_2+W_2=X_2T_2H_2+W_2$.

For $Y_1=\overline{X}_1H_1+W_1=X_1C_1T_2H_1=W_1$, the receive end device may know $Y_1$, and detect $X_1$ by using, for example, a manner in which the GLRT receiver detects the constellation point in the foregoing descriptions, to estimate the matrix $C_1T_2H_1$, which is denoted as $Y'_1=C_1T_2H_1$; for $Y_2=\overline{X}_2H_2+W_2=X_2T_2H_2+W_2$ the receive end device may know $Y_2$, and detect $X_2$ by using, for example, a manner in which the GLRT receiver detects the constellation point in the foregoing descriptions, to determine the matrix $T_2H_2$, which is denoted as $Y'_2=T_2H_2$. Assuming $H_1=H_2$, the matrix $C_1=Y'_1(Y'_2)^{-1}$ may be determined by using $Y'_2(Y'_1)^{-1}=(T_2H_2)(C_1T_2H_1)^{-1}$, and symbols corresponding to the matrix $C_1$ may be demodulated by using a modulation scheme such as PSK, that is, the third to-be-modulated bit may be determined.

Therefore, according to the communication method provided in this embodiment of this application, linear transformation is performed on matrices including symbols corresponding to constellation points of to-be-modulated bits, and data is carried in a differential manner between two matrices that are used to perform linear transformation on matrices each including symbols corresponding to a constellation point, so that the two matrices may be combined to carry three to-be-modulated bits. Therefore, resources that are originally used to transmit only two to-be-modulated bits can be used to transmit three to-be-modulated bits. In this way, in a same resource condition, more data may be carried, thereby improving resource utilization. Specifically, the first to-be-modulated bit and the second to-be-modulated bit that are to be sent are separately modulated to obtain the $P_1$ fifth symbols corresponding to the first constellation point and the $P_2$ second symbols corresponding to the second constellation point. The matrix $T_1$ is used to perform linear transformation on the matrix including the $P_1$ fifth symbols, to obtain the $P_1$ first symbols. The matrix $T_2$ is used to perform linear transformation on the matrix including the $P_2$ second symbols, to obtain the $P_3$ third symbols. In addition, $T_2$ is associated with $T_1$ in a differential manner by using the matrix $C_1$ including the symbols that are determined based on the third to-be-modulated bit, so that the $P_1$ first symbols and the $P_3$ third symbols may be combined to carry the three to-be-modulated bits. In this way, resources that are originally only used to transmit the first to-be-modulated bit and the second to-be-modulated bit can be used to transmit the three to-be-modulated bits, thereby saving resources.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

The communication method according to the embodiments of this application is described in detail above with reference to FIG. 1 to FIG. 5. A communication apparatus according to the embodiments of this application is described in detail below with reference to FIG. 6 and FIG. 7. In the foregoing embodiments provided in this application, the method provided in the embodiments of this application is separately described from a perspective of interaction between the transmit end device and the receive end device. To implement functions in the foregoing methods provided in the embodiments of this application, the transmit end device and the receive end device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

It should be understood that in the embodiments of this application, module division is an example, and is merely logical function division. During actual implementation, there may be another division manner. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 6:
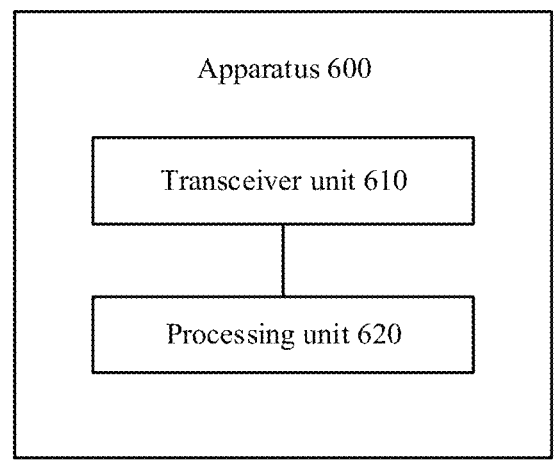
FIG. 6 is a schematic block diagram of a communication apparatus according to an embodiment of this application.

FIG. 6 is a schematic block diagram of a communication apparatus according to an embodiment of this application. The apparatus 600 may be a transmit end device, may be a chip system in the transmit end device, or may be another apparatus that can be used in cooperation with the transmit end device. The apparatus 600 may be a receive end device, may be a chip system in the receive end device, or may be another apparatus that can be used in cooperation with the receive end device. The apparatus 600 includes a transceiver unit 610 and a processing unit 620.

In a possible design, the apparatus is configured to implement a function of the transmit end device in the foregoing methods.

The processing unit 620 is configured to:
  determine $P_1$ first symbols based on a first to-be-modulated bit, where $P_1=M\times N_1$, $N_1$ is a quantity of resource units used to carry the $P_1$ first symbols, M is a positive integer, and $N_1$ is an integer greater than 1;
  determine a second constellation point based on a second to-be-modulated bit, where the second constellation point corresponds to $P_2$ second symbols, $P_2=M\times N_2$, and $N_2$ is an integer greater than 1; and
  determine $P_3$ third symbols based on the $P_1$ first symbols and the $P_2$ second symbols, where $P_3=M\times N_3$, $N_3$ is a quantity of resource units used to carry the $P_3$ third symbols, and $N_3$ is less than or equal to $N_2$.

The transceiver unit 610 is configured to: send P second symbols on N resource units by using M antenna ports, and skip sending demodulation reference signals of the P second symbols, where the P second symbols are the P first symbols, or the P second symbols are symbols determined based on the P first symbols.

The processing unit 620 may be configured to implement the method performed by the transmit end device in the embodiments corresponding to FIG. 3 to FIG. 5.

For specific descriptions, refer to the related descriptions in the method embodiments. Details are not described herein again.

In another possible design, the apparatus is configured to implement a function of the receive end device in the foregoing methods.

The transceiver unit 610 is configured to receive $P_1$ first symbols and $P_3$ third symbols, where $P_1=M\times N_1$, the $P_1$ first symbols are based on a first to-be-modulated bit, $P_3=M\times N_3$, the $P_3$ third symbols are determined based on the $P_1$ first symbols and $P_2$ second symbols, the $P_2$ second symbols are determined based on a second to-be-modulated bit, $P_2=M\times N_2$, M is a positive integer, $N_1$ is a quantity of resource units used to carry the $P_1$ first symbols, $N_1$ is an integer greater than 1, $N_2$ is an integer greater than 1, $N_3$ is a quantity of resource units used to carry the $P_3$ third symbols, and $N_3$ is less than or equal to $N_2$.

The processing unit 620 is configured to determine the first to-be-modulated bit and the second to-be-modulated bit based on the $P_1$ first symbols and the $P_3$ third symbols.

The processing unit 620 may be configured to implement the method performed by the receive end device in the embodiments corresponding to FIG. 3 to FIG. 5.

For specific descriptions, refer to the related descriptions in the method embodiments. Details are not described herein again.

It should be understood that the apparatus 600 herein is presented in a form of a function unit. The term "unit" herein may refer to an application-specific integrated circuit (ASIC), an electronic circuit, a processor (for example, a shared processor, a dedicated processor, or a group processor) configured to execute one or more software or firmware programs, a memory, a logic merging circuit, and/or another appropriate component that supports the described function. In an optional example, a person skilled in the art may understand that the apparatus 600 may be specifically the transmit end device or the receive end device in the foregoing embodiments, and the apparatus 600 may be configured to perform procedures and/or steps that are corresponding to the transmit end device or the receive end device in the foregoing method embodiments. To avoid repetition, details are not described herein again.

The apparatus 600 in the foregoing solutions has functions of implementing corresponding steps performed by the transmit end device or the receive end device in the foregoing methods. The function may be implemented by hardware, may be implemented by software, or may be implemented by hardware executing corresponding software. The hardware or the software includes one or more modules corresponding to the functions. For example, the transceiver unit may be replaced with a transmitter and a receiver, or may be replaced with another communication interface such as an interface. Another unit such as the processing unit may be replaced with a processor, to separately perform receiving and sending operations and a related processing operation in the method embodiments. In addition, the transceiver unit in the apparatus 600 may alternatively include a sending unit and a receiving unit. For performing a receiving-related operation, a function of the transceiver unit may be understood as a receiving operation performed by the receiving unit, and for performing a sending-related operation, a function of the transceiver unit may be understood as a sending operation performed by the sending unit.

Figure 7:
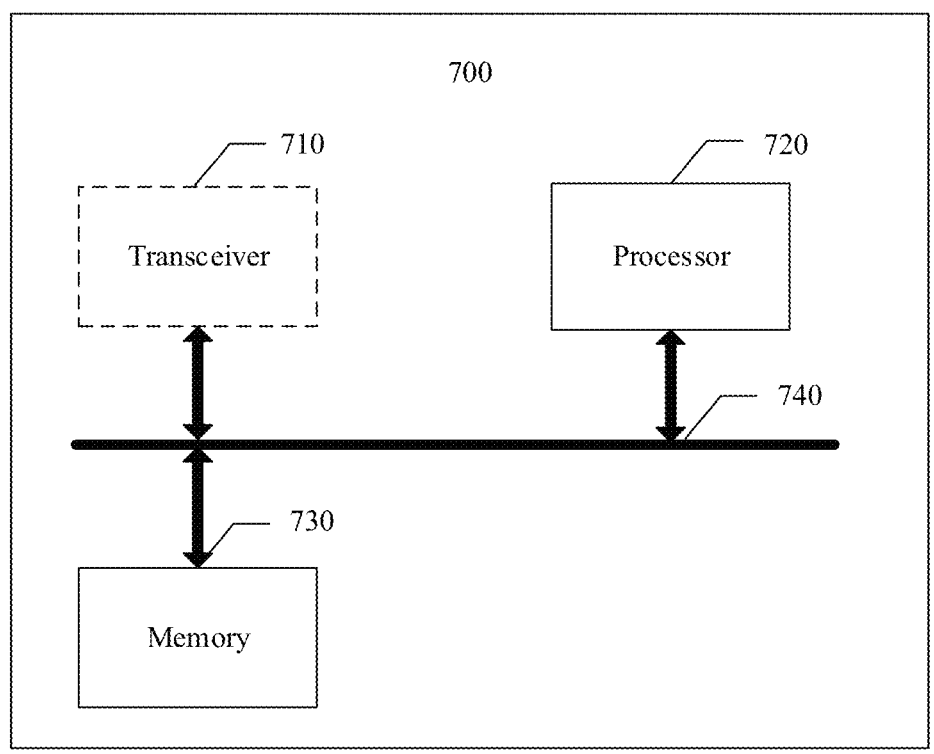
FIG. 7 is a schematic diagram of a structure of a communication apparatus according to an embodiment of this application.

FIG. 7 shows an apparatus 700 according to an embodiment of this application.

In a possible design, the apparatus is configured to implement a function of the transmit end device in the foregoing methods. The apparatus may be a transmit end device, or may be an apparatus that can be disposed in the transmit end device or used in cooperation with the transmit end device.

The apparatus may be a chip system. In this embodiment of this application, the chip system may include a chip, or may include the chip and another discrete component.

The apparatus 700 includes at least one processor 720, configured to implement a function of the transmit end device in the data transmission method provided in the embodiments of this application.

The apparatus 700 may further include at least one memory 730, configured to store program instructions and/or data. The memory 730 is coupled to the processor 720. The coupling in this embodiment of this application is an indirect coupling or a communication connection between apparatuses, units, or modules, may be in an electrical form, a mechanical form, or another form, and is used for information exchange between the apparatuses, the units, or the modules. The processor 720 may operate in collaboration with the memory 730. The processor 720 may execute the program instructions stored in the memory 730. At least one of the at least one memory may be included in the processor.

The apparatus 700 may further include a communication interface. For example, the communication interface may be the transceiver 710, configured to communicate with another device by using a transmission medium, so that an apparatus in the apparatus 700 may communicate with the another device. For example, the another device may be a receive end device. In this embodiment of this application, the communication interface may alternatively be in another form of a circuit, a module, an interface, or the like, and is used for communication between the apparatus 700 and another device.

For example, the processor 720 is configured to:

determine $P_1$ first symbols based on a first to-be-modulated bit, where $P_1=M\times N_1$, $N_1$ is a quantity of resource units used to carry the $P_1$ first symbols, M is a positive integer, and $N_1$ is an integer greater than 1;

determine a second constellation point based on a second to-be-modulated bit, where the second constellation point corresponds to $P_2$ second symbols, $P_2=M\times N_2$, and $N_2$ is an integer greater than 1; and determine $P_3$ third symbols based on the $P_1$ first symbols and the $P_2$ second symbols, where $P_3=M\times N_3$, $N_3$ is a quantity of resource units used to carry the $P_3$ third symbols, and $N_3$ is less than or equal to $N_2$.

The processor 720 sends the $P_1$ first symbols and the $P_3$ third symbols by using the transceiver 710.

The processor 720 may be configured to implement the method performed by the transmit end device in all the embodiments corresponding to FIG. 3 to FIG. 5.

For specific descriptions, refer to the related descriptions in the method embodiments. Details are not described herein again.

In another possible design, the apparatus is configured to implement a function of the receive end device in the foregoing methods. The apparatus may be a receive end device, may be an apparatus that can be disposed in the receive end device, or may be an apparatus that can be used in cooperation with the receive end device. The apparatus may be a chip system.

The apparatus 700 includes at least one processor 720, configured to implement a function of the receive end device in the data transmission method provided in the embodiments of this application.

The apparatus 700 may further include at least one memory 730, configured to store program instructions and/or data. The memory 730 is coupled to the processor 720. The processor 720 may operate in collaboration with the memory 730. The processor 720 may execute the program instructions stored in the memory 730. At least one of the at least one memory may be included in the processor.

The apparatus 700 may further include a communication interface. For example, the communication interface may be the transceiver 710, configured to communicate with another device by using a transmission medium, so that an apparatus in the apparatus 700 may communicate with the another device. For example, the another device may be a transmit end device.

For example, the processor 720 receives $P_1$ first symbols and $P_3$ third symbols by using the transceiver 710, where $P_1 = M \times N_1$, the $P_1$ first symbols are based on a first to-be-modulated bit, $P_3 = M \times N_3$, the $P_3$ third symbols are determined based on the $P_1$ first symbols and $P_2$ second symbols, the $P_2$ second symbols are determined based on a second to-be-modulated bit, $P_2 = M \times N_2$, M is a positive integer, $N_1$ is a quantity of resource units used to carry the $P_1$ first symbols, $N_1$ is an integer greater than 1, $N_2$ is an integer greater than 1, $N_3$ is a quantity of resource units used to carry the $P_3$ third symbols, and $N_3$ is less than or equal to $N_2$.

The processor 720 is configured to determine the first to-be-modulated bit and the second to-be-modulated bit based on the $P_1$ first symbols and the $P_3$ third symbols.

The processor 720 may be configured to implement the method performed by the receive end device in all the embodiments corresponding to FIG. 3 to FIG. 5.

For specific descriptions, refer to the related descriptions in the method embodiments. Details are not described herein again.

In this embodiment of this application, a specific connection medium among the transceiver 710, the processor 720, and the memory 730 is not limited. In this embodiment of this application, in FIG. 7, the memory 730, the processor 720, and the transceiver 710 are connected by using a bus 740. The bus is represented by using a bold line in FIG. 7. A connection manner between other components is merely an example for description, and is not limited thereto. The bus may be classified into an address bus, a data bus, a control bus, and the like. For ease of representation, only one bold line is used to represent the bus in FIG. 7, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and accomplished by using a hardware processor, or may be performed and accomplished by using a combination of hardware and software modules in the processor.

In the embodiments of this application, the memory may be a non-volatile memory, for example, a hard disk drive (HDD) or a solid-state drive (SSD), or may be a volatile memory, for example, a random access memory (RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store the program instructions and/or the data.

All or some of the methods in the embodiments of this application may be implemented by using software, hardware, firmware, or any combination thereof. When being implemented by using the software, all or some of the methods may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, a network device, user equipment, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, an SSD), or the like.

In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining $P_1$ first symbols based on a first to-be-modulated bit, wherein $P_1=M \times N_1$, $N_1$ is a quantity of resource units used to carry the $P_1$ first symbols, M is a positive integer representing a quantity of antenna ports used to send the $P_1$ first symbols, and $N_1$ is an integer greater than 1;
   determining $P_2$ second symbols based on a second to-be-modulated bit, wherein $P_2=M \times N_2$, $N_2$ is equivalent to a quantity of resource units used to carry the $P_2$ second symbols, and $N_2$ is an integer greater than 1;
   determining $P_3$ third symbols based on an association relationship between the $P_1$ first symbols and the $P_2$ second symbols, wherein $P_3=M \times N_3$, $N_3$ is a quantity of resource units used to carry the $P_3$ third symbols, and $N_3$ is less than or equal to $N_2$; and
   sending the $P_1$ first symbols and the $P_3$ third symbols.

2. The method according to claim 1, wherein $N_2=N_3$ and $P_2=P_3$, and wherein:
   the $P_1$ first symbols are carried on the $N_1$ resource units, the $P_3$ third symbols are carried on the $N_3$ resource units, the $P_1$ first symbols and the $P_3$ third symbols comprise $P_4$ overlapping symbols, the $N_1$ resource units and the $N_3$ resource units comprise $N_4$ overlapping resource units, the $P_4$ symbols are carried on the $N_4$ resource units, and the $P_3$ third symbols have a linear relationship with the $P_2$ second symbols, wherein $P_4=M \times N_4$, and $N_4$ is an integer greater than or equal to 1 and less than or equal to M.

3. The method according to claim 1, wherein $N_3=N_2-N_4$ and $P_3=P_2-P_4$, and wherein:
   the $P_1$ first symbols are carried on the $N_1$ resource units, the $N_1$ resource units comprise $N_4$ resource units used to carry $P_4$ symbols, the $P_3$ third symbols are carried on the $N_3$ resource units, and $P_2$ third symbols comprising the $P_4$ symbols and the $P_3$ third symbols have a linear relationship with the $P_2$ second symbols, wherein $P_4=M \times N_4$, and $N_4$ is an integer greater than or equal to 1 and less than or equal to M.

4. The method according to claim 2, wherein the determining $P_3$ third symbols based on an association relationship between the $P_1$ first symbols and the $P_2$ second symbols comprises:
   performing linear transformation on the $P_2$ second symbols based on the $P_4$ symbols and $P_4$ second symbols in the $P_2$ second symbols, to determine the $P_3$ third symbols.

5. The method according to claim 2, wherein $N_4=M$.

6. The method according to claim 1, wherein $N_2=N_3$, and wherein the determining $P_1$ first symbols based on a first to-be-modulated bit comprises:
   determining a first constellation point based on the first to-be-modulated bit, wherein the first constellation point corresponds to $P_1$ fifth symbols; and
   performing, by using a matrix $T_1$, linear transformation on a matrix comprising the $P_1$ fifth symbols, to determine the $P_1$ first symbols; and
   the determining $P_3$ third symbols based on an association relationship between the $P_1$ first symbols and the $P_2$ second symbols comprises:
   performing, by using a matrix $T_2$, linear transformation on a matrix comprising the $P_2$ second symbols, to determine the $P_3$ third symbols, wherein the matrix $T_2$ and the matrix $T_1$ satisfy any one of the following: $C_1=T_1T_2^{-1}$, $C_1=T_1^{-1}T_2$, $C_1=T_2T_1^{-1}$, or $C_1=T_2^{-1}T_1$, wherein matrix $C_1$ is a matrix with M rows and M columns, and wherein a symbol in the matrix $C_1$ is determined based on a third to-be-modulated bit.

7. The method according to claim 6, wherein the $P_1$ first symbols are carried on the $N_1$ resource units, the $P_3$ third symbols are carried on the $N_3$ resource units, and the $N_1$ resource units are adjacent to the $N_3$ resource units in time domain or frequency domain.

8. The method according to claim 6, wherein:
   the first to-be-modulated bit and the second to-be-modulated bit are determined based on at least one bit of a first to-be-transmitted bit stream, and the third to-be-modulated bit is determined based on at least one bit of a second to-be-transmitted bit stream;
   the first to-be-modulated bit and the second to-be-modulated bit belong to a first to-be-transmitted bit stream, and the third to-be-modulated bit belongs to a second to-be-transmitted bit stream;
   the first to-be-modulated bit and the second to-be-modulated bit are determined based on at least one bit of a first to-be-transmitted bit stream, and the third to-be-modulated bit belongs to a second to-be-transmitted bit stream; or
   the first to-be-modulated bit and the second to-be-modulated bit belong to a first to-be-transmitted bit stream, and the third to-be-modulated bit is determined based on at least one bit of a second to-be-transmitted bit stream, wherein:

a code rate of the first to-be-transmitted bit stream is different from a code rate of the second to-be-transmitted bit stream;

a modulation scheme of the first to-be-transmitted bit stream is different from a modulation scheme of the second to-be-transmitted bit stream; and/or spectral efficiency of the first to-be-transmitted bit stream is different from spectral efficiency of the second to-be-transmitted bit stream.

9. The method according to claim 8, wherein the modulation scheme of the second to-be-transmitted bit stream is phase shift keying (PSK).

10. A communication apparatus, comprising:
a communications interface;
a non-transitory memory storage comprising computer-executable instructions; and
one or more processors in communication with the communications interface and to the non-transitory memory storage, wherein the one or more processors execute the computer-executable instructions to cause the communication apparatus to perform operations comprising:
determining $P_1$ first symbols based on a first to-be-modulated bit, wherein $P_1=M \times N_1$, $N_1$ is a quantity of resource units used to carry the $P_1$ first symbols, M is a positive integer representing a quantity of antenna ports used to send the $P_1$ first symbols, and $N_1$ is an integer greater than 1;
determining $P_2$ second symbols based on a second to-be-modulated bit, wherein $P_2=M \times N_2$, $N_2$ is equivalent to a quantity of resource units used to carry the $P_2$ second symbols, and $N_2$ is an integer greater than 1;
determining $P_3$ third symbols based on an association relationship between the $P_1$ first symbols and the $P_2$ second symbols, wherein $P_3=M \times N_3$, $N_3$ is a quantity of resource units used to carry the $P_3$ third symbols, and $N_3$ is less than or equal to $N_2$; and
sending the $P_1$ first symbols and the $P_3$ third symbols through the communication interface.

11. The apparatus according to claim 10, wherein $N_2=N_3$ and $P_2=P_3$, and wherein:
the $P_1$ first symbols are carried on the $N_1$ resource units, the $P_3$ third symbols are carried on the $N_3$ resource units, the $P_1$ first symbols and the $P_3$ third symbols comprise $P_4$ overlapping symbols, the $N_1$ resource units and the $N_3$ resource units comprise $N_4$ overlapping resource units, the $P_4$ symbols are carried on the $N_4$ resource units, and the $P_3$ third symbols have a linear relationship with the $P_2$ second symbols, wherein $P_4=M \times N_4$, and $N_4$ is an integer greater than or equal to 1 and less than or equal to M.

12. The apparatus according to claim 10, wherein $N_3=N_2-N_4$ and $P_3=P_2-P_4$, and wherein:
the $P_1$ first symbols are carried on the $N_1$ resource units, the $N_1$ resource units comprise $N_4$ resource units used to carry $P_4$ symbols, the $P_3$ third symbols are carried on the $N_3$ resource units, and $P_2$ third symbols comprising the $P_4$ symbols and the $P_3$ third symbols have a linear relationship with the $P_2$ second symbols, wherein $P_4=M \times N_4$, and $N_4$ is an integer greater than or equal to 1 and less than or equal to M.

13. The apparatus according to claim 11, wherein the determining $P_3$ third symbols based on an association relationship between the $P_1$ first symbols and the $P_2$ second symbols comprises:

performing linear transformation on the $P_2$ second symbols based on the $P_4$ symbols and $P_4$ second symbols in the $P_2$ second symbols, to determine the $P_3$ third symbols.

14. The apparatus according to claim 11, wherein $N_4=M$.

15. The apparatus according to claim 10, wherein $N_2=N_3$, and wherein
the determining $P_1$ first symbols based on a first to-be-modulated bit comprises:
determining a first constellation point based on the first to-be-modulated bit, wherein the first constellation point corresponds to $P_1$ fifth symbols; and
performing, by using a matrix $T_1$, linear transformation on a matrix comprising the $P_1$ fifth symbols, to determine the $P_1$ first symbols; and
the determining $P_3$ third symbols based on an association relationship between the $P_1$ first symbols and the $P_2$ second symbols comprises:
performing, by using a matrix $T_2$, linear transformation on a matrix comprising the $P_2$ second symbols, to determine the $P_3$ third symbols, wherein the matrix $T_2$ and the matrix $T_1$ satisfy any one of the following: $C_1=T_1 T_2^{-1}$, $C_1=T_1^{-1} T_2$, $C_1=T_2 T_1^{-1}$, or $C_1=T_2^{-1} T_1$, wherein matrix $C_1$ is a matrix with M rows and M columns, and wherein a symbol in the matrix $C_1$ is determined based on a third to-be-modulated bit.

16. A communication apparatus, comprising:
a communications interface;
a non-transitory memory storage comprising computer-executable instructions; and
one or more processors in communication with the communications interface and to the non-transitory memory storage, wherein the one or more processors execute the computer-executable instructions to cause the communication apparatus to perform operations comprising:
receiving $P_1$ first symbols and $P_3$ third symbols, wherein $P_1=M \times N_1$, the $P_1$ first symbols are determined based on a first to-be-modulated bit, $P_3=M \times N_3$, the $P_3$ third symbols are determined based on the $P_1$ first symbols and $P_2$ second symbols, the $P_2$ second symbols are determined based on a second to-be-modulated bit, $P_2=M \times N_2$, M is a positive integer representing a quantity of antenna ports used to send the $P_1$ first symbols, $N_1$ is a quantity of resource units used to carry the $P_1$ first symbols, $N_1$ is an integer greater than 1, $N_2$ is an integer greater than 1, $N_2$ is equivalent to a quantity of resource units used to carry the $P_2$ second symbols, $N_3$ is a quantity of resource units used to carry the $P_3$ third symbols, and $N_3$ is less than or equal to $N_2$; and
determining the first to-be-modulated bit and the second to-be-modulated bit based on an association relationship between the $P_1$ first symbols and the $P_3$ third symbols.

17. The apparatus according to claim 16, wherein $N_2=N_3$ and $P_2=P_3$, and wherein:
the $P_1$ first symbols are carried on the $N_1$ resource units, the $P_3$ third symbols are carried on the $N_3$ resource units, the $N_1$ resource units and the $N_3$ resource units comprise $N_4$ overlapping resource units, the $P_1$ first symbols and the $P_3$ third symbols comprise $P_4$ overlapping symbols, the $P_4$ symbols are carried on the $N_4$ resource units, and the $P_3$ third symbols have a linear relationship with the $P_2$ second symbols, wherein $P_4 = M \times N_4$, and $N_4$ is an integer greater than or equal to 1 and less than or equal to M.

18. The apparatus according to claim 17, wherein:

$\overline{X}_2 = A_1 B_2 X_2$, wherein matrix $X_2$ is a matrix comprising the $P_2$ second symbols, the matrix $X_2$ is a matrix with M rows and $N_2$ columns, the matrix $\overline{X}_2$ is a matrix comprising the $P_3$ third symbols, matrix $\overline{X}_2$ is a matrix with M rows and $N_3$ columns, matrix $B_2$ is a matrix comprising $P_4$ second symbols in the $P_2$ second symbols, the matrix $B_2$ is a matrix with M rows and $N_4$ columns, matrix $A_1$ is a matrix comprising the $P_4$ symbols, and the matrix $A_1$ is a matrix with M rows and $N_4$ columns.

19. The apparatus according to claim 16, wherein $N_3 = N_2 - N_4$ and $P_3 = P_2 - P_4$, and wherein:

the $P_1$ first symbols are carried on the $N_1$ resource units, the $N_1$ resource units comprise $N_4$ resource units used to carry $P_4$ symbols, the $P_3$ third symbols are carried on the $N_3$ resource units, and $P_2$ third symbols comprising the $P_4$ symbols and the $P_3$ third symbols have a linear relationship with the $P_2$ second symbols, wherein $P_4 = M \times N_4$, and $N_4$ is an integer greater than or equal to 1 and less than or equal to M.

20. The apparatus according to claim 19, wherein:

$\overline{X}_2 = A_1 B_2 X_2$, wherein matrix $X_2$ is a matrix comprising the $P_2$ second symbols, the matrix $X_2$ is a matrix with M rows and $N_2$ columns, matrix $X_2$ is a matrix comprising the $P_2$ third symbols, the matrix $\overline{X}_2$ is a matrix with M rows and $N_2$ columns, matrix $A_1$ is a matrix comprising the $P_4$ symbols, the matrix $A_1$ is a matrix with M rows and $N_4$ columns, matrix $B_2$ is a matrix comprising $P_4$ second symbols in the $P_2$ second symbols, the matrix $B_2$ is a matrix with M rows and $N_4$ columns, and symbols corresponding to a matrix ($\overline{X}_2 - A_1$) are the $P_3$ third symbols.

\* \* \* \* \*

UNITED STATES PATENT AND TRADEMARK OFFICE
CERTIFICATE OF CORRECTION

PATENT NO. : 12,088,444 B2
APPLICATION NO. : 17/556608
DATED : September 10, 2024
INVENTOR(S) : Yi Qin and Fan Wang Page 1 of 1

It is certified that error appears in the above-identified patent and that said Letters Patent is hereby corrected as shown below:

In the Claims

In Column 52, In Line 9, In Claim 20, delete "$X_2$" and insert --$\bar{X}_2$--.

Signed and Sealed this
Seventeenth Day of December, 2024

Derrick Brent
*Acting Director of the United States Patent and Trademark Office*